(12) United States Patent
Yan

(10) Patent No.: US 12,328,635 B2
(45) Date of Patent: Jun. 10, 2025

(54) MOBILITY INFORMATION REPORTING METHOD AND UE

(71) Applicant: DATANG MOBILE COMMUNICATIONS EQUIPMENT CO., LTD., Beijing (CN)

(72) Inventor: Nan Yan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 385 days.

(21) Appl. No.: 18/016,604

(22) PCT Filed: Jul. 20, 2021

(86) PCT No.: PCT/CN2021/107473
§ 371 (c)(1),
(2) Date: Jan. 17, 2023

(87) PCT Pub. No.: WO2022/017400
PCT Pub. Date: Jan. 27, 2022

(65) Prior Publication Data
US 2023/0292214 A1    Sep. 14, 2023

(30) Foreign Application Priority Data

Jul. 24, 2020  (CN) .......................... 202010725118.6

(51) Int. Cl.
*H04W 36/36* (2009.01)
*H04W 36/00* (2009.01)
*H04W 36/18* (2009.01)

(52) U.S. Cl.
CPC ..... *H04W 36/362* (2023.05); *H04W 36/0079* (2018.08); *H04W 36/00835* (2018.08); *H04W 36/18* (2013.01)

(58) Field of Classification Search
CPC ........... H04W 36/362; H04W 36/0079; H04W 36/00835; H04W 36/18; H04W 24/02;
(Continued)

(56) References Cited

U.S. PATENT DOCUMENTS

2021/0289414 A1   9/2021   Shi et al.
2022/0400415 A1*  12/2022  Xie ................... H04W 36/0079
(Continued)

FOREIGN PATENT DOCUMENTS

CN    101808354 A    8/2010
CN    106792938 A    5/2017
(Continued)

OTHER PUBLICATIONS

Nokia, Correction to Mobility Enhancements, 3 GPP TSG-RAN WG2 #109bis-e, R2-2003857, Apr. 30, 2020, 8 pages.
(Continued)

*Primary Examiner* — Hashim S Bhatti
(74) *Attorney, Agent, or Firm* — Meunier Carlin & Curfman LLC

(57) ABSTRACT

The present invention provides a mobility information reporting method and a UE. The method comprises: when a cell change or a cell reaccess is triggered, performing cell handover to a target cell indicated by a network side, and/or when an appropriate cell is selected, and the appropriate cell is in a candidate cell list, establishing communication with the appropriate cell; and recording mobility information corresponding to cell handover and/or communication establishment with the appropriate cell, and reporting the mobility information. By using the method provided in the present invention, DAPS and/or CHO/CPC mobility success/failure information can be recorded and reported, the generated omission or misjudgment is reduced, and the
(Continued)

accuracy for parameter adjustment after the network side receives the reporting is improved.

18 Claims, 7 Drawing Sheets

(58) Field of Classification Search
CPC . H04W 24/10; H04W 36/185; H04W 36/305; H04W 8/08
See application file for complete search history.

(56) References Cited

U.S. PATENT DOCUMENTS

| | | | |
|---|---|---|---|
| 2023/0262540 A1* | 8/2023 | Kim | H04W 36/362 370/216 |
| 2023/0327790 A1* | 10/2023 | Da Silva | H04B 17/3913 455/67.11 |

FOREIGN PATENT DOCUMENTS

| | | |
|---|---|---|
| CN | 107666672 A | 2/2018 |
| CN | 110913428 A | 3/2020 |
| CN | 111246499 A | 6/2020 |
| CN | 112822728 A | 5/2021 |
| EP | 3902310 A1 | 10/2021 |
| WO | 2019195060 A1 | 10/2019 |
| WO | 2020147050 A1 | 7/2020 |

OTHER PUBLICATIONS

3GPP TSG RAN, 3rd Generation Partnership Project; Technical Specification Group Radio Access Network; NR; Radio Resource Control (RRC) protocol specification (Release 16), (Jul. 23, 2020).
China Telecom, "Corrections to even further mobility enhancement in E-UTRAN," 3GPP TSG-RAN2 Meeting #110-e, R2-2005756, Jun. 1, 2020-Jun. 12, 2020.
Nokia et al., "On RLF reporting for CHO and Daps," R2-1915497, 3GPP TSG-RAN WG2 Meeting #108 Reno, USA, Nov. 19-22, 2019.

* cited by examiner

MOBILITY INFORMATION REPORTING METHOD AND UE

CROSS REFERENCE TO RELATED APPLICATIONS

The present application is a National Stage of International Application No. PCT/CN2021/107473, filed on Jul. 20, 2021, which claims the priority to Chinese Patent Application No. 202010725118.6, filed to China National Intellectual Property Administration on Jul. 24, 2020, both of which are incorporated in their entirety herein by reference.

FIELD

The present disclosure relates to the technical field of radio communication, and in particular to a method and UE for reporting mobility information.

BACKGROUND

In a conventional 4th generation (4G) network and a 5th generation release 15 (5G R15) version, when a mobile terminal is handed over from a source cell to a target cell, the mobile terminal generally releases connection with the source cell before establishing connection with the target cell, which results in the mobile terminal's inability to transmit or receive data for a short time period. In order to reduce a handover interruption time and improve reliability, R16 mobility enhancement standardizes two parts: a dual active protocol stack (DAPS) handover and a conditional handover/conditional PSCell change (CHO/CPC).

The DAPS handover is an optimization over a traditional handover and may reduce a time latency of service interruption during the handover. As for the DAPS handover, the terminal maintains connection with an original base station until the terminal successfully accesses a target base station and then releases the connection with the original base station in a process that a handover command is sent to the terminal and the handover is executed.

A CHO/CPC is an optimization over the traditional handover (HO) (synchronous reconfiguration) or a traditional primary secondary cell change (PSCell change).

A network can configure a UE with multiple handover target cells and handover related parameters of each of the multiple handover target cells in advance and transmit them to the UE as candidates. When the UE satisfies a measurement evaluation threshold included in the handover configuration parameter of any one of the candidate cells, the UE directly initiates the handover to the corresponding target cell for a fast handover/change of a secondary node. When the UE occurs a radio link failure or handover (synchronous reconfiguration) failure, if a suitable cell subsequently selected by the UE is in the scope of the candidate cells, the UE can execute a handover process again for this new candidate cell without reestablishment temporarily, as permitted by the network. If the handover succeeds, possible data interruption and reestablishment caused by a radio link failure/handover failure will be successfully avoided.

In a dual connectivity (DC) scene, the network can also configure the UE with multiple target cells for PSCell changes and related parameters of each of the multiple target cells in advance and transmit them to the UE as candidates. When the UE satisfies a measurement evaluation threshold included in a configuration parameter of any one of the candidate cells, the UE directly initiates the PScell change to the corresponding target cell for a fast change to a secondary node.

As for a traditional handover (synchronous reconfiguration) or radio link monitoring, when a failure occurs, the UE records failure related information and informs a network side, that the UE collects the failure related information, by uplink signaling, and the network may trigger the acquisition for the failure related information from the UE and applied it to the optimization of the network.

But after a DAPS or CHO/CPC mobility failure/success, how the terminal records these scenes and reports these scenes to the network for parameter optimization to reduce failures or improve performance, there is currently no established solution. Omission or misidentification may be generated if a failure recording mode in the traditional handover is still used, affecting the accuracy of parameter adjustment by the network side after receiving a report from the UE.

SUMMARY

The present disclosure provides a method and UE for reporting mobility information, which may solve the problem that omission or misidentification may be generated under the condition that a failure recording mode in a traditional handover is used in other mobility scenes, affecting the accuracy of parameter adjustment by a network side after reception of a report from the UE.

According to a first aspect, the present disclosure provides a method for reporting mobility information, applied to a user equipment (UE) and including: in a condition that a cell change or cell reaccess is triggered, executing a cell change to a target cell indicated by a network side, and/or executing establishment of communication with a suitable cell, where the suitable cell is a cell, which is in a candidate cell list, selected by the UE during the cell change or the cell reaccess; and recording mobility information corresponding to execution of the cell change and/or mobility information corresponding to establishment of communication with the suitable cell, and reporting the mobility information.

Optionally, the method further includes at least one of following steps: when it is determined that a dual active protocol stack (DAPS) handover to the target cell fails, performing a radio resource connection fallback to a source cell, and recording mobility information; or when it is determined that a network is not successfully accessed after the cell change, executing radio resource connection reestablishment, and recording mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the recording mobility information includes executing any one of following steps: recording that the DAPS handover to the target cell fails, and radio resource connection fallback to the source cell succeeds; recording that the DAPS handover to the target cell fails, the UE occurs a radio link failure (RLF) in the source cell, and execution of radio resource connection reestablishment succeeds/fails; recording that the DAPS handover to the target cell fails, the UE occurs an RLF in the source cell, and the UE selects a suitable cell and a conditional handover (CHO) for establishing communication with the suitable cell succeeds; recording that the DAPS handover to the target cell fails, the UE occurs an RLF in the source cell, a subsequent CHO fails, and execution of radio connection reestablishment succeeds/fails; recording that the DAPS handover to the target cell succeeds; recording that the DAPS handover to the target cell succeeds, the UE occurs an RLF in the target cell, and radio resource connection fallback to the source cell succeeds; recording that the DAPS handover to the target cell succeeds, the UE occurs an RLF in the target cell, the UE occurs an RLF in the source cell, and execution of radio resource connection reestablishment succeeds/fails; recording that the DAPS handover to the target cell succeeds, the UE occurs an RLF in the target cell, and a subsequent CHO succeeds; or recording that the DAPS handover to the target cell succeeds, the UE occurs an RLF in the target cell, a subsequent CHO fails, and execution of radio resource connection reestablishment succeeds/fails.

Optionally, under the condition that a scene triggering cell reaccess is that the UE occurs an RLF in a master cell group (MCG)/secondary cell group (SCG), the recoding mobility information includes executing any one of following steps: recording that the UE occurs an RLF in the MCG, and the UE selects a suitable cell and a CHO for establishing communication with the suitable cell succeeds; recording that the UE occurs an RLF in the MCG, the UE selects a suitable cell and a CHO for establishing communication with the suitable cell fails, and the UE continuously selects a suitable cell and a CHO succeeds/fails; recording that the UE occurs an RLF in the MCG, and the UE selects a suitable cell and a CHO for establishing communication with the suitable cell fails; recording that the UE occurs an RLF in the MCG, the UE selects a suitable cell and a CHO for establishing communication with the suitable cell fails, and continuous execution of radio resource connection reestablishment succeeds/fails; recording that after the UE occurs an RLF in the SCG, the UE selects a suitable cell and a conditional primary secondary cell change (CPC) for establishing communication with the suitable cell succeeds; or recording that the UE occurs an RLF in the SCG, the UE selects a suitable cell and a CPC for establishing communication with the suitable cell fails, and the UE continuously selects a suitable cell and a CPC succeeds/fails.

Optionally, under the condition that a scene type of the cell change is a handover (HO)/primary secondary cell change (PSCell change)/CHO/CPC, the recording mobility information includes executing any one of following steps: recording that after the HO to the target cell fails/the UE selects a suitable cell and the CHO for establishing communication with the suitable cell fails, a subsequent CHO succeeds; recording that after the HO/CHO to the target cell fails, a subsequent CHO fails; recording that after the HO/CHO to the target cell fails, a subsequent CHO fails, and continuous execution of radio resource connection reestablishment succeeds/fails; recording that after the HO/CHO to the target cell fails, continuous execution of radio resource connection reestablishment succeeds/fails; recording that the HO/CHO to the target cell succeeds; recording that the traditional primary secondary cell change (PSCell change) fails/the UE selects a suitable cell and the CPC for establishing communication with the suitable cell fails, and a subsequent CPC succeeds; recording that the traditional primary secondary cell change (PSCell change)/the CPC fails, and a subsequent CPC fails; or recording that the traditional primary secondary cell change (PSCell change) succeeds/the UE selects a suitable cell and the CPC for establishing communication with the suitable cell succeeds.

Optionally, under the condition that the mobility information includes multiple entries, before reporting the mobility information, the method further includes: determining the multiple entries having an associated relation, and merging content portions, belonging to a same information item and having a content similarity satisfying a requirement, of the multiple entries; and/or, binding the multiple entries having an associated relation, and recording the associated relation between the bound multiple entries.

Optionally, the merging content portions, belonging to the same information item and having the content similarity satisfying the requirement, of the multiple entries includes merging any one or more of the following content portions: a cell level/beam level signal measurement result for a serving/neighboring cell; or geographic position information.

Optionally, any one or more of the following unmerged content portions of the multiple entries are listed individually in the multiple entries: timestamp information; timer information; a reason for recording each entry; or random access channel (RACH) related information.

Optionally, the recording the associated relation between the bound multiple entries includes executing at least one of following steps: recording related entries having an associated relation, and when a cell change of a new scene type is determined, deleting a previously recorded entry; using the same identify to point to the related entries having an associated relation; or using a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

According to a second aspect, the present disclosure provides a user equipment (UE) for reporting mobility information. The UE includes a memory and a processor, where: the memory is configured for storing a computer program; and the processor is configured for reading the program from the memory and execute following steps: in a condition that a cell change or cell reaccess is triggered, executing a cell change to a target cell indicated by a network side, and/or executing establishment of communication with a suitable cell, where the suitable cell is a cell, which is in a candidate cell list, selected by the UE during the cell change or the cell reaccess; and recording mobility information corresponding to execution of the cell change and/or mobility information corresponding to establishment of communication with the suitable cell, and reporting the mobility information.

Optionally, the processor is further configured for executing at least one of following steps: when it is determined that a dual active protocol stack (DAPS) handover to the target cell fails, performing a radio resource connection fallback to a source cell, and recording mobility information; or when it is determined that a network is not successfully accessed after the cell change, executing radio resource connection reestablishment, and recording mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the processor executes any one of following steps when recording mobility information: recording that the DAPS handover to the target cell fails, and radio resource connection fallback to the source cell succeeds; recording that the DAPS handover to the target cell fails, the UE occurs a radio link failure (RLF) in the source cell, and execution of radio resource connection reestablishment succeeds/fails; recording that the DAPS handover to the target cell fails, the UE occurs an RLF in the source cell, and the UE selects a suitable cell and a conditional handover (CHO) for establishing communication with the suitable cell succeeds; recording that the DAPS handover to the target cell fails, the UE occurs an RLF in the source cell, a subsequent CHO fails, and execution of radio connection reestablishment succeeds/fails; recording that the DAPS handover to the target cell succeeds; recording that the DAPS handover to the target cell succeeds, the UE occurs an RLF in the target cell, and radio resource connection fallback to the source cell succeeds; recording that the DAPS handover to the target cell succeeds, the UE occurs an RLF in the target cell, the UE occurs an RLF in the source cell, and execution of radio resource connection reestablishment succeeds/fails; recording that the DAPS handover to the target cell succeeds, the UE occurs an RLF in the target cell, and a subsequent CHO succeeds; or recording that the DAPS handover to the target cell succeeds, the UE occurs an RLF in the target cell, a subsequent CHO fails, and execution of radio resource connection reestablishment succeeds/fails.

Optionally, under the condition that a scene triggering cell reaccess is that the UE occurs an RLF in an MCG/SCG, the processor executes any one of following steps when recoding mobility information: recording that the UE occurs an RLF in the MCG, and the UE selects a suitable cell and a CHO for establishing communication with the suitable cell succeeds; recording that the UE occurs an RLF in the MCG, the UE selects a suitable cell and a CHO for establishing communication with the suitable cell fails, and the UE continuously selects a suitable cell and a CHO succeeds/fails; recording that the UE occurs an RLF in the MCG, and the UE selects a suitable cell and a CHO for establishing communication with the suitable cell fails; recording that the UE occurs an RLF in the MCG, the UE selects a suitable cell and a CHO for establishing communication with the suitable cell fails, and continuous execution of radio resource connection reestablishment succeeds/fails; recording that after the UE occurs an RLF in the SCG, the UE selects a suitable cell and a conditional primary secondary cell change (CPC) for establishing communication with the suitable cell succeeds; or recording that the UE occurs an RLF in the SCG, the UE selects a suitable cell and a CPC for establishing communication with the suitable cell fails, and the UE continuously selects a suitable cell and a CPC succeeds/fails.

Optionally, under the condition that a scene type of the cell change is a traditional handover (HO)/PSCell change/CHO/CPC, the processor executes any one of following steps when recording mobility information: recording that after the HO to the target cell fails/the UE selects a suitable cell and the CHO for establishing communication with the suitable cell fails, a subsequent CHO succeeds; recording that after the HO/CHO to the target cell fails, a subsequent CHO fails; recording that after the HO/CHO to the target cell fails, a subsequent CHO fails, and continuous execution of radio resource connection reestablishment succeeds/fails; recording that after the HO/CHO to the target cell fails, continuous execution of radio resource connection reestablishment succeeds/fails; recording that the HO/CHO to the target cell succeeds; recording that the traditional primary secondary cell change (PSCell change) fails/the UE selects a suitable cell and the CPC for establishing communication with the suitable cell fails, and a subsequent CPC succeeds; recording that the traditional primary secondary cell change (PSCell change)/the CPC fails, and a subsequent CPC fails; or recording that the traditional primary secondary cell change (PSCell change) succeeds/the UE selects a suitable cell and the CPC for establishing communication with the suitable cell succeeds.

Optionally, the mobility information includes multiple entries, and before reporting the mobility information, the processor is further configured for: determining the multiple entries having an associated relation, and merging content portions, belonging to a same information item and having a content similarity satisfying a requirement, of the multiple entries; and/or, binding the multiple entries having an associated relation, and recording the associated relation between the bound multiple entries.

Optionally, the processor merges content portions, belonging to the same information item and having the content similarity satisfying the requirement, of the multiple entries, and is further configured for merging any one or more of the following content portions: a cell level/beam level signal measurement result for a serving/neighboring cell; or geographic position information.

Optionally, the processor lists any one or more of the following unmerged content portions of the multiple entries individually in the multiple entries: timestamp information; timer information; a reason for recording each entry; or random access channel (RACH) related information.

Optionally, the processor executes at least one of following steps when recording the associated relation between the bound multiple entries: recording related entries having an associated relation, and when a cell change of a new scene type is determined, deleting a previously recorded entry; using the same identify to point to the related entries having an associated relation; or using a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

According to a third aspect, the present disclosure provides a user equipment (UE) for reporting mobility information. The UE includes: a communication unit configured for executing, when a cell change or cell reaccess is triggered, a cell change to a target cell indicated by a network side, and/or executing establishment of communication with a suitable cell, where the suitable cell is a cell, which is in a candidate cell list, selected by the UE during the cell change or the cell reaccess; and a recording and reporting unit configured for recording mobility information corresponding to execution of the cell change and/or mobility information corresponding to establishment of communication with the suitable cell, and reporting the mobility information.

Optionally, the communication unit is further configured for executing at least one of following steps: when it is determined that a DAPS handover to the target cell fails, performing a radio resource connection fallback to a source cell, and recording mobility information; or when it is determined that a network is not successfully accessed after the cell change, executing radio resource connection reestablishment, and recording mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the recording and reporting unit is specifically configured for executing any one of following steps when recording mobility information: recording that the DAPS handover to the target cell fails, and radio resource connection fallback to the source cell succeeds; recording that the DAPS handover to the target cell fails, the UE occurs a radio link failure (RLF) in the source cell, and execution of radio resource connection reestablishment succeeds/fails; recording that the DAPS handover to the target cell fails, the UE occurs an RLF in the source cell, and the UE selects a suitable cell and a conditional handover (CHO) for establishing communication with the suitable cell succeeds; recording that the DAPS handover to the target cell fails, the UE occurs an RLF in the source cell, a subsequent CHO fails, and execution of radio connection reestablishment succeeds/fails; recording that the DAPS handover to the target cell succeeds; recording that the DAPS handover to the target cell succeeds, the UE occurs an RLF in the target cell, and radio resource connection fallback to the source cell succeeds; recording that the DAPS handover to the target cell succeeds, the UE occurs an RLF in the target cell, the UE occurs an RLF in the source cell, and execution of radio resource connection reestablishment succeeds/fails; recording that the DAPS handover to the target cell succeeds, the UE occurs an RLF in the target cell, and a subsequent CHO succeeds; or recording that the DAPS handover to the target cell succeeds, the UE occurs an RLF in the target cell, a subsequent CHO fails, and execution of radio resource connection reestablishment succeeds/fails.

Optionally, under the condition that a scene triggering cell reaccess is that the UE occurs an RLF in an MCG/SCG, the recording and reporting unit is specifically configured for executing any one of following steps when recoding mobility information: recording that the UE occurs an RLF in the MCG, and the UE selects a suitable cell and a CHO for establishing communication with the suitable cell succeeds; recording that the UE occurs an RLF in the MCG, the UE selects a suitable cell and a CHO for establishing communication with the suitable cell fails, and the UE continuously selects a suitable cell and a CHO succeeds/fails; recording that the UE occurs an RLF in the MCG, and the UE selects a suitable cell and a CHO for establishing communication with the suitable cell fails; recording that the UE occurs an RLF in the MCG, the UE selects a suitable cell and a CHO for establishing communication with the suitable cell fails, and continuous execution of radio resource connection reestablishment succeeds/fails; recording that after the UE occurs an RLF in the SCG, the UE selects a suitable cell and a conditional primary secondary cell change (CPC) for establishing communication with the suitable cell succeeds; or recording that the UE occurs an RLF in the SCG, the UE selects a suitable cell and a CPC for establishing communication with the suitable cell fails, and the UE continuously selects a suitable cell and a CPC succeeds/fails.

Optionally, under the condition that a scene type of the cell change is a traditional handover (HO)/PSCell change/CHO/CPC, the recording and reporting unit is specifically configured for executing any one of following steps when recording mobility information: recording that after the HO to the target cell fails/the UE selects a suitable cell and the CHO for establishing communication with the suitable cell fails, a subsequent CHO succeeds; recording that after the HO/CHO to the target cell fails, a subsequent CHO fails; recording that after the HO/CHO to the target cell fails, a subsequent CHO fails, and continuous execution of radio resource connection reestablishment succeeds/fails; recording that after the HO/CHO to the target cell fails, continuous execution of radio resource connection reestablishment succeeds/fails; recording that the HO/CHO to the target cell succeeds; recording that the traditional primary secondary cell change (PSCell change) fails/the UE selects a suitable cell and the CPC for establishing communication with the suitable cell fails, and a subsequent CPC succeeds; recording that the traditional primary secondary cell change (PSCell change)/the CPC fails, and a subsequent CPC fails; or recording that the traditional primary secondary cell change (PSCell change) succeeds/the UE selects a suitable cell and the CPC for establishing communication with the suitable cell succeeds.

Optionally, under the condition that the mobility information includes multiple entries, before reporting the mobility information, the recording and reporting unit is further configured for: determining the multiple entries having an associated relation, and merging content portions, belonging to a same information item and having a content similarity satisfying a requirement, of the multiple entries; and/or, binding the multiple entries having an associated relation, and recording the associated relation between the bound multiple entries.

Optionally, the recording and reporting unit merges content portions, belonging to the same information item and having the content similarity satisfying the requirement, of the multiple entries, and is further configured for merging any one or more of the following content portions: a cell level/beam level signal measurement result for a serving/neighboring cell; or geographic position information.

Optionally, the recording and reporting unit lists any one or more of the following unmerged content portions of the multiple entries individually in the multiple entries: timestamp information; timer information; a reason for recording each entry; or random access channel (RACH) related information.

Optionally, the recording and reporting unit is specifically configured for executing at least one of following steps when recording the associated relation between the bound multiple entries: recording related entries having an associated relation, and when a cell change of a new scene type is determined, deleting a previously recorded entry; using the same identify to point to the related entries having an associated relation; or using a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

According to a fourth aspect, the present disclosure provides a computer-readable storage medium, storing a computer program, where when executed by a processor, the program implements steps of the method for reporting mobility information provided in the first aspect above.

According to a fifth aspect of embodiments of the present disclosure, provided is a chip. The chip is coupled with a memory in a device, such that the chip may call a program instruction stored in the memory during running to implement the above aspects of the embodiments of the present application and any possible method to which the aspects relate.

According to a sixth aspect of embodiments of the present disclosure, provided is a computer program product. When the computer program product runs on an electronic device, the electronic device executes the above aspects of the embodiments of the present application and any possible method to which the aspects relate.

The method and the UE for reporting mobility information provided in embodiments of the present disclosure have the following beneficial effects.

By using the method provided in the present disclosure, mobility information for different mobility scenes can be recorded. Since the mobility information is recorded, the recording of the mobility information is optimized, thereby causing the network side to optimize configuration according to the optimized mobility information, reducing omission or misidentification generated, and improving the accuracy for parameter adjustment by the network side after reception of a report.

DETAILED DESCRIPTION OF THE EMBODIMENTS

In order to make the objectives, technical solutions, and advantages of the embodiments of the present application clearer, the technical solutions in the embodiments of the present application will be clearly and completely described below in conjunction with the accompanying drawings in the embodiments of the present application. Apparently, the described embodiments are some embodiments rather than all embodiments of the present application. Based on the embodiments of the present application, all other embodiments obtained by those of ordinary skill in the art without making creative efforts fall within the scope of protection of the present application.

In the description of embodiments of the present application, unless otherwise stated, "/" means and/or, for example, A/B can mean A and/or B. As used herein, "and/or" is merely used to describe an associated relation between associated objects and means that three relations can be present, for example, A and/or B can mean A alone, A and B together, and B alone.

Embodiment 1

Figure 1:
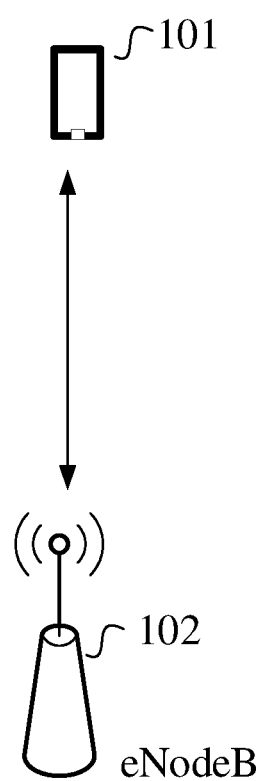
FIG. 1 is a schematic diagram of a system for reporting mobility information according to an embodiment of the present disclosure.

An embodiment of the present disclosure provides a system for reporting mobility information. As shown in FIG. 1, the system includes a user equipment (UE) 101 and a network side device 102.

The UE 101 is configured for executing, when a cell change or cell reaccess is triggered, a cell change to a target cell indicated by a network side, and/or establishing communication with a suitable cell when the suitable cell is selected and the suitable cell is in a candidate cell list; and recording mobility information corresponding to execution of the cell change and/or mobility information corresponding to establishment of communication with the suitable cell, and reporting the associated mobility information.

The network side device 102 is configured for receiving the mobility information reported by the UE for cell change to a target cell indicated by the network side after triggering the cell change/cell reaccess and/or the mobility information about communication with a selected suitable cell when the suitable cell is in a candidate cell list.

The user equipment (UE) 101 is specifically configured for executing, when a cell change or cell reaccess is triggered, a cell change to a target cell indicated by a network side, and/or executing establishment of communication with a suitable cell, where the suitable cell is a cell, which is in a candidate cell list, selected by the UE during the cell change or the cell reaccess; and recording mobility information corresponding to execution of the cell change and/or mobility information corresponding to establishment of communication with the suitable cell, and reporting the mobility information.

In the embodiment of the present disclosure, the user equipment UE may specifically refer to an access terminal, a user unit, a user station, a mobile station, a mobile station, a remote station, a remote terminal, a mobile device, a user terminal, a terminal, a radio communication device, a user agent or a user apparatus. The access terminal may be a cellular telephone, a cordless telephone, a session initiation protocol (SIP) phone, a wireless local loop (WLL) station, a personal digital assistant (PDA), a handheld device having a radio communication function, a computing device or other processing devices connected to a radio modem, an in-vehicle device, a wearable device, a mobile station in 5G networks or a subscribing device in future evolved public land mobile network (PLMN) networks, etc.

The network side device may be a next generation node B (gNB) in a 5G system, a base transceiver station (BTS) in a global system of mobile communication (GSM) system or a code division multiple access (CDMA), a node B (NB) in a wideband code division multiple access (WCDMA) system, an evolutional node B (eNB or eNodeB) in a long term evolution (LTE) system, etc.

In FIG. 1, for ease of description, only one user equipment and one network side device are shown. In a practical system, multiple terminals and network side devices may coexist, which will not be repeated herein.

It will be noted that the above system architecture is merely illustrative of a system architecture suitable for embodiments of the present disclosure, and the system architecture suitable for the embodiments of the present disclosure have entities added or removed compared with a system architecture as shown in FIG. 1.

Embodiments of the present disclosure record mobility information in two mobility scenes as follows.

1) Mobility Scene of Triggering Cell Reaccess

During implementation, cell reaccess may be triggered when the UE determines that it occurs a radio link failure (RLF) in its own cell, and when the UE selects a suitable cell and the suitable cell is in a candidate cell list, establishing communication with the suitable cell are executed.

When establishing communication with the suitable cell fails, a suitable cell may be selected again, and when the suitable cell is in the candidate cell list, communication with the suitable cell is established.

The establishing communication with a suitable cell when the suitable cell is selected and the suitable cell is in a candidate cell list may be a conditional handover (CHO)/conditional primary secondary cell change (CPC).

Specifically, the UE may trigger a CHO/CPC after the UE occurs a radio link failure (RLF) in a master cell group (MCG)/secondary cell group (SCG).

2) Mobility Scene of Triggering Cell Change

During implementation, a handover to a target cell indicated by a network side may be triggered, or an establishment for communication with a suitable cell may be triggered.

Under the condition that the handover to the target cell indicated by the network side, which may be an HO, is triggered, a cell change to the target cell indicated by the network side is executed. Under the condition that a dual active protocol stack (DAPS) handover is triggered, the DAPS handover to the target cell indicated by the network side is executed.

When the above cell change fails, a suitable cell may be further selected, and when the suitable cell is in the candidate cell list, communication with the suitable cell is established.

The establishing communication with a suitable cell when the suitable cell is selected and the suitable cell is in a candidate cell list may be a CHO.

Specifically, a suitable cell may be selected to execute a CHO after an HO failure or a suitable cell may be selected to execute a CHO after a DAPS handover failure.

Under the condition of triggering an establishment for communication with a suitable cell, the UE selects a suitable cell, and when the suitable cell is in the candidate cell list, communication with the suitable cell is established.

The establishing communication with a suitable cell when the suitable cell is selected and the suitable cell is in a candidate cell list may be a CHO/CPC.

When the above cell change fails, a suitable cell may be further selected, and when the suitable cell is in the candidate cell list, communication with the suitable cell is established.

Specifically, a suitable cell may be selected for a CHO/CPC after the CHO/CPC is triggered. Reference may be made to the prior art for the reasons for triggering the CHO/CPC, which will not be described in detail herein.

It is to be noted that under the condition that the mobility scene is triggering a DAPS handover, when it is determined that the DAPS handover to the target cell fails, a radio resource connection fallback to a source cell is performed, and mobility information corresponding to the fallback is recorded.

When it is determined that a network is not successfully accessed after the cell change, radio resource connection reestablishment is executed, and mobility information corresponding to the radio resource connection reestablishment is recorded.

For different mobility scenes, scenes where a network is not successfully accessed after the cell change are different, a specific process for each of the above mobility scenes referred in the embodiments of the present application and situations, where radio resource connection reestablishment may be executed corresponding to the specific process are provided below.

Figure 2:
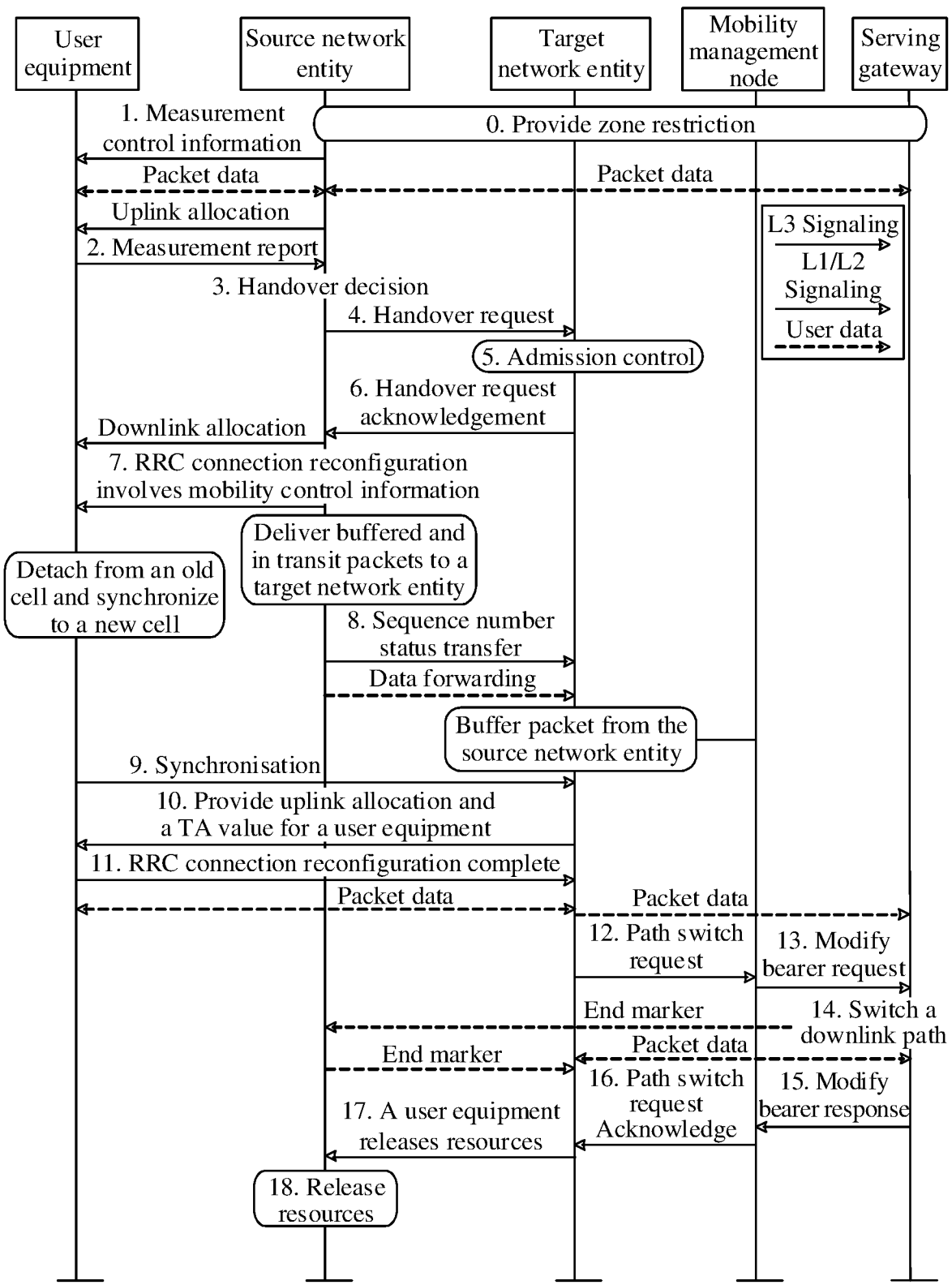
FIG. 2 is a schematic flowchart of a handover of a traditional handover (synchronous reconfiguration).

1) A schematic diagram of a handover flow of an HO (synchronous reconfiguration) is shown in FIG. 2. The flow is to interrupt data transmission at a source side, access to a target node, and then continue service transmission, which may cause large data interruption.

2) DAPS Handover

The DAPS handover is an optimization over a traditional handover and may reduce a latency of service interruption during the handover. The UE maintains connection with a source base station in a process that a handover command is sent to the UE and the handover is executed, and the UE does not release the connection with the source base station until the UE successfully accesses a target base station. Under the condition that during execution of the DAPS handover, the UE fails to access the target base station, but a UE end may still maintain connection with the source base station in this case, the terminal will recover signaling connection with the source base station and report a failure message at the source base station to indicate a DAPS handover failure.

Figure 3:
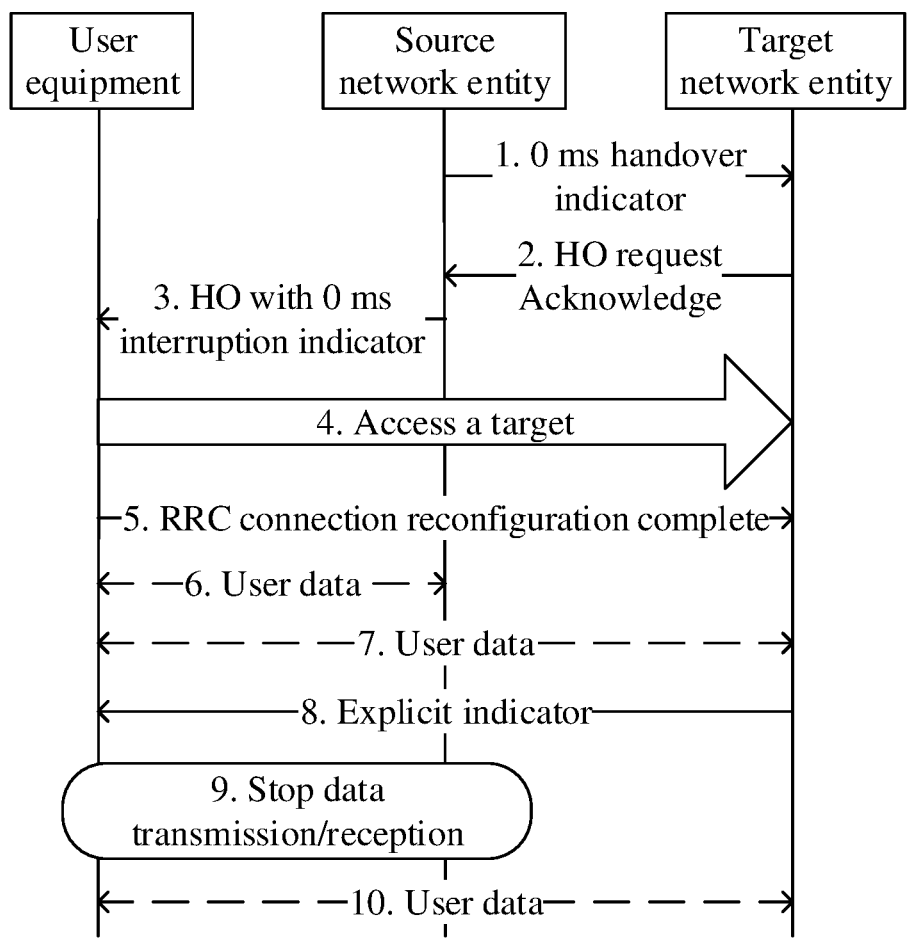
FIG. 3 is a schematic flowchart of a dual active protocol stack (DAPS) handover success used in an embodiment of the present disclosure.

A schematic flowchart of a DAPS handover success used in an embodiment of the present disclosure is shown in FIG. 3, and mainly includes the following.

Step 1-5: an original data transmission link between a source network entity (new radio next generation node B (NR gNB) or next generation evolutional node B (ng-eNB)) and a UE at all times is maintained; and after a target network entity (NR gNB or ng-eNB) receives a 0 ms handover indicator from the source network entity (NR gNB or ng-eNB) and further receives a radio resource control (RRC) reconfiguration complete message from the UE, under the condition that a data packet (data processed with new security context encryption or integrity protection) of a downlink packet data convergence protocol (PDCP) or a control frame to be sent is present in a buffer, the data packet or the control frame is transmitted to the UE by means of a new link.

Step 6-7: data transmitting and reception between the UE and the two network entities (NR gNB or ng-eNB) are maintained.

Step 8: the target network entity (NR gNB or ng-eNB) notifies the UE to complete data transmission, expects the UE to release data connection between the source network entity (NR gNB or ng-eNB) and the UE.

Step 9: the UE stops uplink transmission and downlink reception between the source network entity (NR gNB or ng-eNB) and the UE and starts releasing entire MCG configuration on a source side.

Step 10: the UE maintains data transmission and reception with the target network entity (NR gNB or ng-eNB) only.

Figure 4:
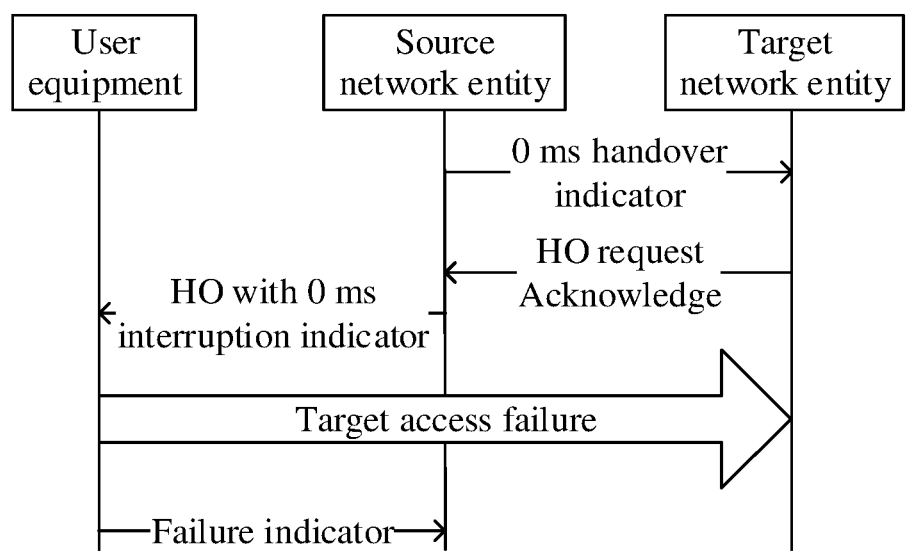
FIG. 4 is a schematic flowchart of a DAPS handover failure used in an embodiment of the present disclosure.

A schematic flowchart of a DAPS handover failure used in an embodiment of the present disclosure is shown is shown in FIG. 4. A main process is as follows.

Under the condition that a UE fails in a random access to a target base station, or a radio link failure occurs immediately after the UE successfully accesses the target base station (target RLF), but the UE does not occur an RLF in a source side, the UE may fall back to source cell configuration, recover bearers at the source cell, and report a DAPS failure indicator notification to the source side. The source side cell may continue to serve the UE.

Under the condition that the UE fails in a random access to a target base station, and the UE also occurs an RLF in a source side, the UE cannot fall back to source cell connection, and a reestablishment process of the UE is triggered.

Under the condition that a radio link failure occurs immediately after a UE successfully accesses a target base station (target RLF), and the UE also occurs an RLF in a source side (source RLF), the UE cannot fall back to source cell connection either, and a reestablishment process of the UE is also triggered.

3) Traditional Primary Secondary Cell Change (PSCell Change)

A specific flow of a primary secondary cell change (PSCell change) is known in the art and will not be described in detail herein.

4) CHO/CPC

The CHO/CPC is also an optimization for a traditional handover (synchronous reconfiguration) or a traditional PSCell change. A network may configure the UE with multiple handover target cells and respective handover related parameters in advance and transmit the cells to the UE as candidates. When the UE satisfies a measurement evaluation threshold included in the handover configuration parameter of any one of the candidate cells satisfies the handover may be initiated directly to the corresponding target cell for a fast handover. In a dual connectivity (DC) scene, the network may also configure the UE with multiple target cells for PSCell changes and respective related parameters in advance and transmit the cells to the UE as candidates. When the UE satisfies a measurement evaluation threshold included in the configuration parameter of any one of the candidate cells, the PScell change may be initiated directly to the corresponding target cell for a fast change of a secondary node.

5) Cell Reaccess

The UE occurs a radio link failure (RLF) in a master cell group (MCG)/secondary cell group (SCG), and under the condition that a suitable cell subsequently selected by the UE falls within a candidate cell range, the UE may execute a handover/change process again for the new candidate cell without reestablishment temporarily, as permitted by the network. Under the condition that the handover/change succeeds this time, possible data interruption and reestablishment caused by a radio link failure/handover/cell change failure is successfully avoided.

Certainly, as for the above HO/PSCell change/CHO/CPC process, when the UE occurs a handover (synchronous reconfiguration) failure/PSCell change failure/conditional handover (conditional synchronous reconfiguration) failure/ conditional PSCell change failure, under the condition that a suitable cell subsequently selected by the UE falls within a candidate cell range, the UE may execute a handover/ change process again for the new candidate cell without reestablishment temporarily, as permitted by the network. Under the condition that the handover/change succeeds this time, possible data interruption and reestablishment caused by a radio link failure/handover/cell change failure is successfully avoided.

It can be seen that under different mobility scenes, the UE needs to execute at least one action, or execute multiple inter-related actions. For example in a scene where a DAPS handover is triggered, the UE needs to execute multiple inter-related actions, where one possible scene is that UE initiates a DAPS handover to target cell, the DAPS handover fails and the UE occurs a radio link failure (RLF) in the source cell, radio resource connection reestablishment is executed, and reestablishment succeeds.

By using the above system for reporting mobility information provided in the embodiment of the present disclosure, the mobility information corresponding to triggering a cell change/cell reaccess may be recorded and reported to the network side, such that the network side may optimize configuration more accurately due to comprehensive recording of the actions of the entire process. The mobility information recorded above includes any one or more of a scene type, a failure cause, a signal measurement result, a target cell/suitable cell, or each mobility success/failure. The scene type may be any one of the above mobility scenes. An action execution result may include whether the execution succeeds/fails. When the execution fails, a reason for the failure may be further recorded. Further, target cell/suitable cell information and a signal measurement result are recorded for configuration optimization by the network side.

Possible implementation modes of recording mobility information are provided below for different mobility scenes.

1) Mobility Scene of Triggering DAPS Handover

As for a scene triggering a DAPS handover, the step of recording mobility information includes executing any one of following steps: record that the DAPS handover to the target cell fails, and radio resource connection fallback to the source cell succeeds; record that the DAPS handover to the target cell fails, the UE occurs a radio link failure (RLF) in the source cell, and execution of radio resource connection reestablishment succeeds; record that the DAPS handover to the target cell fails, the UE occurs a radio link failure (RLF) in the source cell, and execution of radio resource connection reestablishment fails; record that the DAPS handover to the target cell fails, the UE occurs an RLF in the source cell, and the UE selects a suitable cell and a conditional handover (CHO) for establishing communication with the suitable cell succeeds; record that the DAPS handover to the target cell fails, the UE occurs an RLF in the source cell, the UE continuously selects a suitable cell and a CHO for establishing communication with the suitable cell fails, and execution of radio resource connection reestablishment succeeds; record that the DAPS handover to the target cell fails, the UE occurs an RLF in the source cell, the UE continuously selects a suitable cell and a CHO for establishing communication with the suitable cell fails, and execution of radio resource connection reestablishment fails; record that the DAPS handover to the target cell succeeds; record that the DAPS handover to the target cell succeeds, the UE occurs an RLF in the target cell, and radio resource connection fallback to the source cell succeeds; record that the DAPS handover to the target cell succeeds, the UE occurs an RLF in the target cell, the UE occurs an RLF in the source cell, and execution of radio resource connection reestablishment succeeds; record that the DAPS handover to the target cell succeeds, the UE occurs an RLF in the target cell, the UE occurs an RLF in the source cell, and execution of radio resource connection reestablishment fails; record that the DAPS handover to the target cell succeeds, the UE occurs an RLF in the target cell, and continuous execution of the UE selects a suitable cell and a CHO for establishing communication with the suitable cell succeeds; record that the DAPS handover to the target cell succeeds, the UE occurs an RLF in the target cell, continuous execution of the UE selects a suitable cell and a CHO for establishing communication with the suitable cell fails, and execution of radio resource connection reestablishment succeeds; or record that the DAPS handover to the target cell succeeds, the UE occurs an RLF in the target cell, continuous execution of the UE selects a suitable cell and a CHO for establishing communication with the suitable cell fails, and execution of radio resource connection reestablishment fails.

2) Mobility Scene of Cell Reaccess

A scene triggering cell reaccess may be an RLF in an MCG/SCG. The step of recoding mobility information includes any one of following steps: record that the UE occurs an RLF in the MCG, and the UE selects a suitable cell and a CHO for establishing communication with the suitable cell succeeds; record that the UE occurs an RLF in the MCG, the UE selects a suitable cell and a CHO for establishing communication with the suitable cell fails, and the UE continuously selects a suitable cell and a CHO succeeds; record that the UE occurs an RLF in the MCG, the UE selects a suitable cell and a CHO for establishing communication with the suitable cell fails, and the UE continuously selects a suitable cell and a CHO fails; record that the UE occurs an RLF in the MCG, and the UE selects a suitable cell and a CHO for establishing communication with the suitable cell fails; record that the UE occurs an RLF in the MCG, the UE selects a suitable cell and a CHO for establishing communication with the suitable cell fails, and continuous execution of radio resource connection reestablishment succeeds; record that the UE occurs an RLF in the MCG, the UE selects a suitable cell and a CHO for establishing communication with the suitable cell fails, and continuous execution of radio resource connection reestablishment fails; record that after the UE occurs an RLF in the SCG, the UE selects a suitable cell and a conditional primary secondary cell change (CPC) for establishing communication with the suitable cell succeeds; record that the UE occurs an RLF in the SCG, the UE selects a suitable cell and a CPC for establishing communication with the suitable cell fails, and the UE continuously selects a suitable cell and a CPC succeeds; or record that the UE occurs an RLF in the SCG, the UE selects a suitable cell and a CPC for establishing communication with the suitable cell fails, and the UE continuously selects a suitable cell and a CPC fails.

3) Mobility Scene of HO/PSCell Change/CHO/CPC

A scene type of the cell change is an HO/PSCell change/CHO/CPC, the step of recording mobility information when the HO/PSCell change/CHO/CPC is triggered includes any one of following steps: record that after the HO to the target cell fails, the UE continuously selects a suitable cell and a CHO for establishing communication with the suitable cell succeeds; record that after the UE selects a suitable cell and a CHO for establishing communication with the suitable cell fails, a subsequent CHO succeeds; record that after the HO to the target cell fails, a subsequent CHO fails; record that after the UE selects a suitable cell and a CHO for establishing communication with the suitable cell fails, a subsequent CHO fails; record that the HO to the target cell fails, the UE continuously selects a suitable cell and a CHO for establishing communication with the suitable cell fails, and continuous execution of radio resource connection reestablishment succeeds; record that the HO to the target cell fails, the UE continuously selects a suitable cell and a CHO for establishing communication with the suitable cell fails, and continuous execution of radio resource connection reestablishment fails; record that after the UE selects a suitable cell and a CHO for establishing communication with the suitable cell fails, a subsequent CHO fails, and continuous execution of radio resource connection reestablishment succeeds; record that after the UE selects a suitable cell and a CHO for establishing communication with the suitable cell fails, a subsequent CHO fails, and continuous execution of radio resource connection reestablishment fails; record that after the HO to the target cell fails, continuous execution of radio resource connection reestablishment succeeds; record that after the HO to the target cell fails, continuous execution of radio resource connection reestablishment fails; record that after the UE selects a suitable cell and a CHO for establishing communication with the suitable cell fails, continuous execution of radio resource connection reestablishment succeeds; record that after the UE selects a suitable cell and a CHO for establishing communication with the suitable cell fails, continuous execution of radio resource connection reestablishment fails; record that the HO to the target cell succeeds; record that the UE selects a suitable cell and a CHO for establishing communication with the suitable cell succeeds; record that the traditional primary secondary cell change (PSCell change) fails, and continuous execution of the UE selects a suitable cell and the CPC for establishing communication with the suitable cell succeeds; record that the UE selects a suitable cell and a CPC for establishing communication with the suitable cell fails, a subsequent CPC succeeds; record that the traditional primary secondary cell change (PSCell change) fails, and continuous execution of the UE selects a suitable cell and a CPC for establishing communication with the suitable cell fails; record that after the UE selects a suitable cell and a CPC for establishing communication with the suitable cell fails, a subsequent CPC fails; record that the traditional primary secondary cell change (PSCell change) succeeds; or record that the UE selects a suitable cell and a CPC for establishing communication with the suitable cell succeeds.

As an optional implementation mode, the mobility information includes multiple entries, in the sense that one action corresponds to at least one entry, and one entry corresponds to one piece of mobility information, before reporting the mobility information, the implementation mode further includes executing at least one of the following steps.

1) Determine the multiple entries having an associated relation, and merge content portions, belonging to the same information item and having the content similarity satisfying the requirement, of the multiple entries.

The step of merging content portions, belonging to the same information item and having the content similarity satisfying the requirement, of the multiple entries includes merging any one or more of following content portions: a cell level/beam level signal measurement result for a serving/neighboring cell; or geographic position information.

Any one or more of the following unmerged content portions of the multiple entries are listed individually in the multiple entries: timestamp information; timer information; a reason for recording each entry (for example: a radio link failure, an RACH failure, RLC reaching the maximum number of retransmission, T310 timeout, T312 timeout, a handover failure, an SCG failure, a reestablishment failure, etc.); or random access channel (RACH) related information (for example: the number of preamble transmission, reference symbol related parameters, carrier information, contention resolution related information, etc.).

2) Bind the multiple entries having an associated relation, and record the associated relation between the bound multiple entries.

When the multiple recorded entries have an associated relation, the UE records multiple failures/successes, and failure/failure information entries and designates relations between these information entries, for example, the steps executed in any one of the above mobility scenes.

The step of recording the associated relation between the bound multiple entries includes executing at least one of following steps: record related entries having an associated relation, and when a cell change of a new scene type is determined, delete a previously recorded entry; use the same identify to point to the related entries having an associated relation; or use a hierarchical protocol architecture to only contain the same entries having an associated relation in one container.

The related entry records having an associated relation include: an information record of each mobility success/failure from triggering the cell change/cell reaccess to the UE successfully completing a cell change/radio resource connection fallback/radio resource connection reestablishment/entering an idle or inactive state.

Specific examples of reporting mobility information are provided below in conjunction with different mobility scenes.

Example 1

In this example, after a UE occurs an RLF in an MCG, a subsequent CHO succeeds/fails.

When the UE occurs the RLF in the MCG, the UE will start a T311 timer for cell selection. Under the condition that a suitable cell selected by the UE falls within a candidate cell range of the CHO, the UE may not initiate reestablishment and use instead a CHO handover configuration parameter that the UE has saved for the candidate cell so as to execute a handover procedure for the candidate cell, as permitted by the network.

Figure 5:
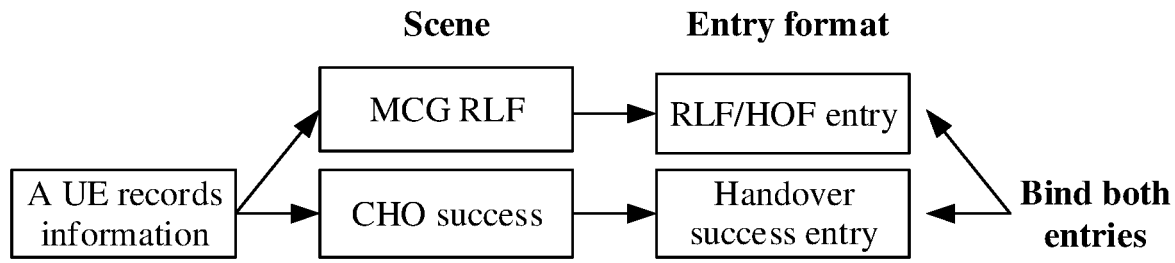
FIG. 5 is a schematic diagram of entries recorded corresponding to a conditional handover (CHO) success after a radio link failure (RLF) in a master cell group (MCG) and a binding relation used in an embodiment of the present disclosure.

FIG. 5 is a schematic diagram of entries recorded corresponding to a conditional handover (CHO) success after a radio link failure (RLF) in a master cell group (MCG) and a binding relation used in an embodiment of the present disclosure. Two entries in different entry formats are bound, that is, under the condition that the CHO succeeds, the UE may record related information for the RLF in the MCG and may also record handover success related information for the CHO candidate cell, for example, RACH information, cell measurement results, etc.

Figure 6:
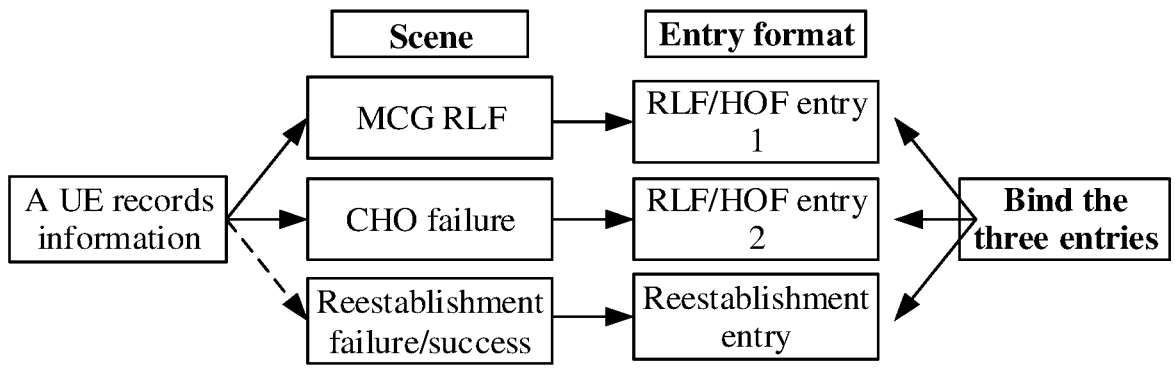
FIG. 6 is a schematic diagram of entries recorded corresponding to a CHO failure after an RLF in an MCG and a binding relation used in an embodiment of the present disclosure.

FIG. 6 is a schematic diagram of entries recorded corresponding to a CHO failure after an RLF in an MCG and a binding relation used in an embodiment of the present disclosure. Under the condition that a subsequent CHO fails, the UE may record related information for the RLF in the MCG and may also record handover failure (HOF) related information for the CHO candidate cell, for example, RACH information, cell measurement results, etc; and after the subsequent CHO fails, the UE starts the T311 timer again for cell selection until no suitable cell is selected/reestablishment succeeds after the UE selects a suitable cell/reestablishment fails after the UE selects a suitable cell. The UE may also perform association recording for the aforementioned information and reestablishment related information.

For such information, the UE may record separate related information entries for an RLF/HOF/handover success or failure/reestablishment success or failure, etc., and bind the associated UE record information.

The UE record information having an associated relation means that the different information recorded is each mobility success/failure information record from a radio link failure of the UE to successful completion of a handover/reestablishment/entrance into an idle state or inactive state this time.

Binding the associated UE record information may use at least one of the methods including but not limited to the following.

The UE records related entries having an associated relation only; under the condition that a new scene (unassociated with a previous UE record) triggers the UE record, the UE deletes all previous record contents; uses the same identify to point to the associated entries; or uses a hierarchical protocol architecture to only contain entries having an associated relation in one container.

Example 2

In this example, a UE DAPS handover fails, the UE occurs an RLF in a source cell, and the UE initiates connection reestablishment.

When a handover of the UE configured with a DAPS fails, whether a source side link is still present will be determined at first. Under the condition that the UE does not occur an RLF in a source side, the UE falls back to configured connection of the source cell and transmits a failure information indicator to the source cell. Under the condition that the UE occurs a source RLF in the source cell, the UE cannot fall back to the connection with the source cell, and the UE may select a suitable cell to initiate a CHO handover or reestablishment.

Since the record of the DAPS is at a UE level and neither a network nor the UE may save UE configuration information when the UE leaves a connected state, the network cannot determine a process of a UE failure and a true reason under the condition that the subsequent UE behavior of the DAPS is not distinguished and recorded.

Figure 7:
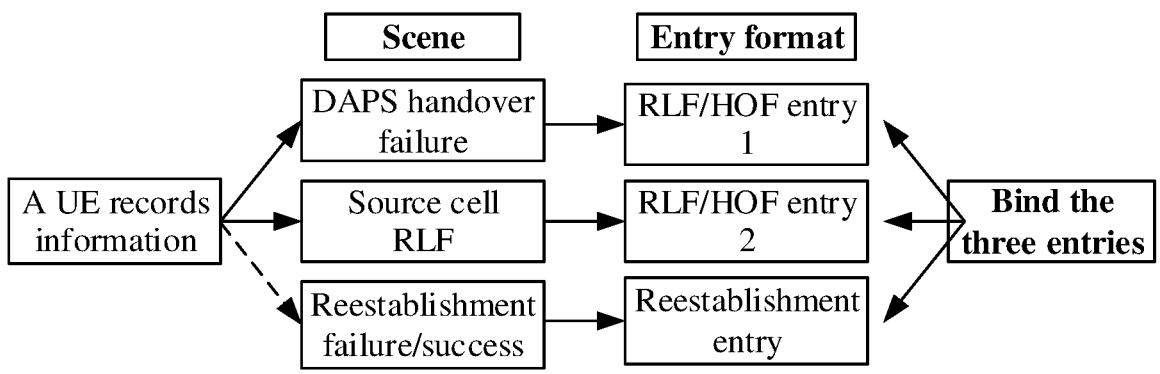
FIG. 7 is a schematic diagram of entry information recorded corresponding to a source cell fallback failure after a DAPS handover failure and a binding relation used in an embodiment of the present disclosure.

When the UE DAPS handover fails and the UE subsequently fails to be recoverd to the source cell, the UE may select a suitable cell to initiate reestablishment, and entry information recorded corresponding to this process and a binding relation are shown in FIG. 7.

Figure 8:
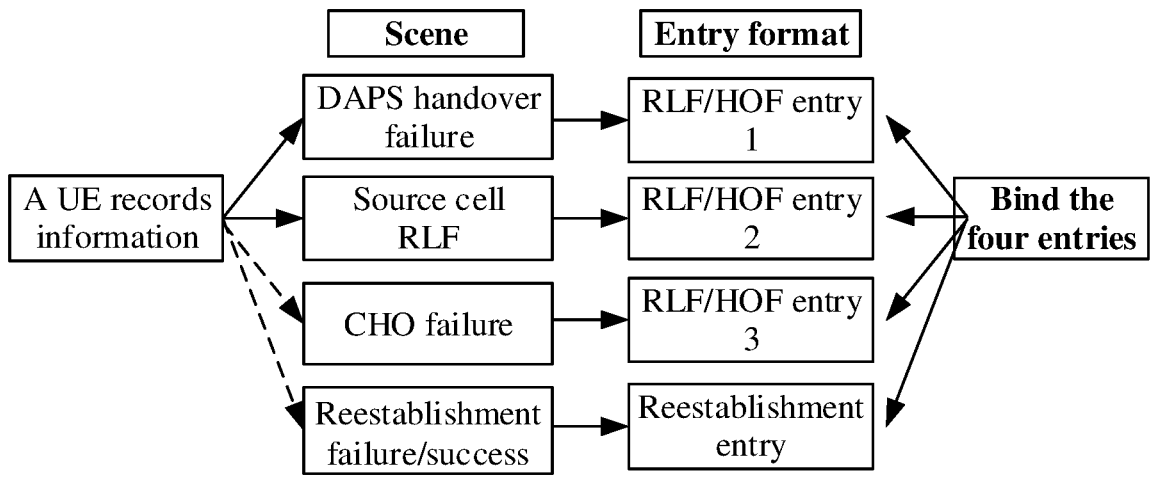
FIG. 8 is a schematic diagram of entry information recorded corresponding to a CHO failure after a source cell fallback failure after a DAPS handover failure and a binding relation used in an embodiment of the present disclosure.

Under the condition that the UE occurs the DAPS handover failure and subsequently fails to be recovered to the source cell, the UE may also select a suitable CHO candidate cell to initiate a handover, and entry information recorded corresponding to this process and a binding relation are shown in FIG. 8.

The UE may record the related entries having an associated relation in a time sequence in which all failures/successes occur and bind or merge the associated UE record information. The UE record information having an associated relation means that different information recorded is each mobility success/failure information record from a DAPS failure of the UE to successful completion of a handover/reestablishment/entrance into an idle state or inactive state this time.

In the case of merging the associated UE record information, similar information capable of being merged includes at least one of the following contents: a cell level/beam level signal measurement result for a serving/neighboring cell; or geographic position information.

Other information, for example, timestamp information, timer information, reasons for each entry (for example, a radio link failure, an RACH failure, RLC reaching the maximum number of retransmission, T310 timeout, T312 timeout, a handover failure, an SCG failure, a reestablishment failure, etc.), and RACH related information (for example: the number of preamble transmission, reference symbol related parameters, carrier information, contention resolution related information, etc.) may be listed individually in the entries separately.

Example 3

In this example, a UE DAPS handover succeeds, but a UE occurs an RLF in a target side, and a source cell connection recovery succeeds.

Figure 9:
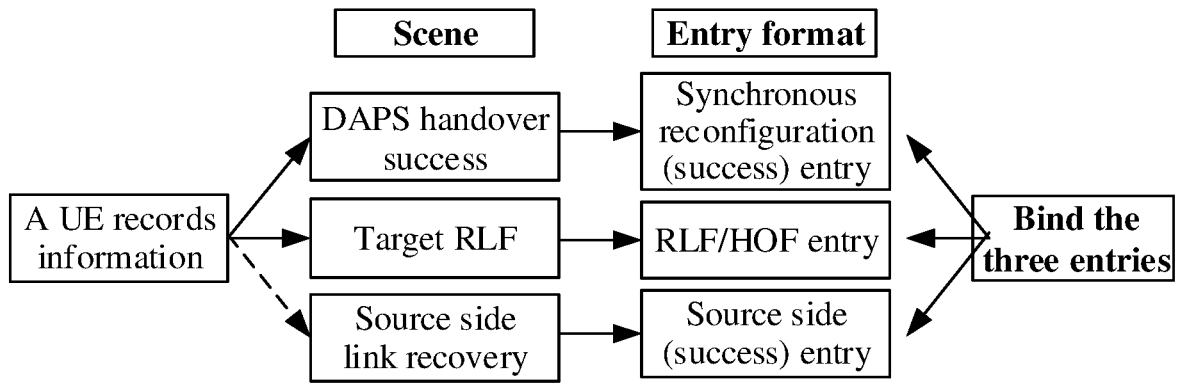
FIG. 9 is a schematic diagram of related entry information recorded corresponding to a source cell connection recovery success when a user equipment (UE) DAPS handover succeeds but the UE occurs an RLF in a target side, and a binding relation.

After the UE configured with DAPS succeeds in handover, under the condition that the UE occurs a radio link failure (target RLF) in the target side soon, and under the condition that the UE does not occur an RLF in a source side, the UE falls back to configured connection of the source cell. The related entry information that the UE may record correspondingly and a binding relation are shown in FIG. 9.

The UE may record the related entries having an associated relation in a time sequence in which all failures/successes occur and bind or merge the associated UE record information. For link recovery of the UE at the source side, an entry format may contain only one daps recovered indication information, and/or time association information to the previous target RLF. Other measurement information may be combined with other previously associated entries to be recorded and reported.

Example 4

In this example, after a UE occurs a PSCell change/CPC failure, a subsequent CPC succeeds/fails.

When the UE occurs an RLF in an SCG or a PSCell change/CPC, the UE may start a timer to select a new suitable cell. Under the condition that the newly selected suitable cell falls within a CPC candidate cell range, the UE may not initiate SCG failure reporting temporarily and apply instead a CPC configuration parameter that the UE has saved for the candidate cell so as to execute a cell change process for the candidate cell, as permitted by the network.

Figure 10:
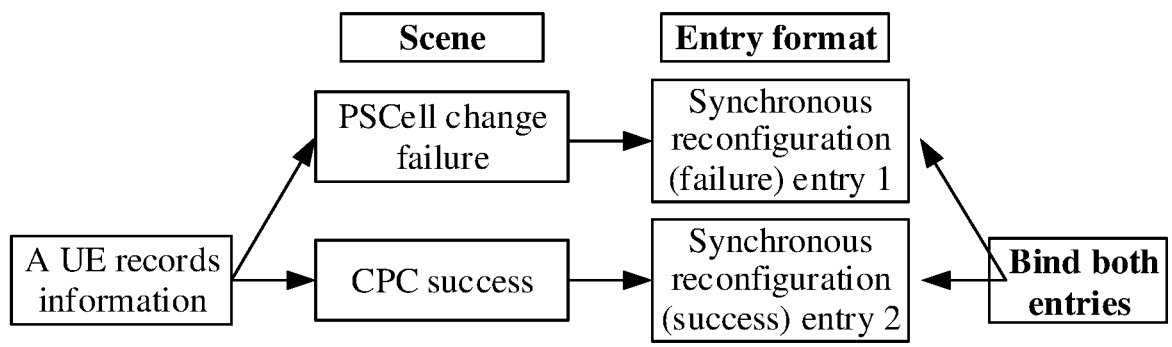
FIG. 10 is a schematic diagram of related entry information recorded corresponding to a conditional PScell change (CPC) success after a UE occurs a primary secondary cell (PScell) change failure, and a binding relation used in an embodiment of the present disclosure.

As shown in FIG. 10, under the condition that a subsequent CPC succeeds, the UE may record information related to a radio link failure or synchronous reconfiguration failure in the SCG and may further record cell change success related information for this CPC candidate cell, for example, RACH information, cell measurement results, etc.

Figure 11:
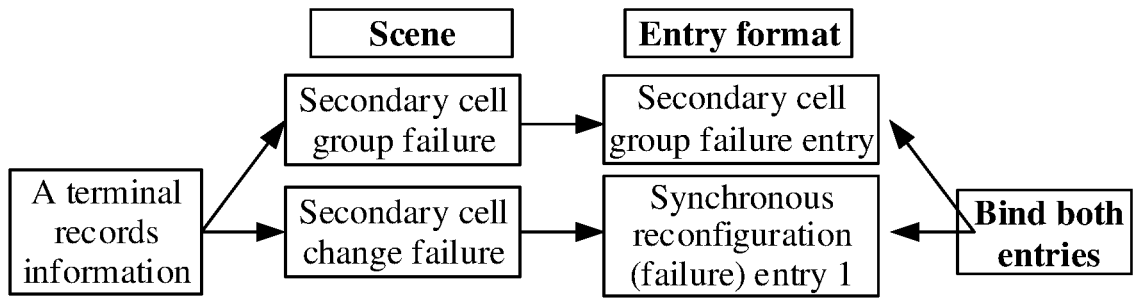
FIG. 11 is a schematic diagram of related entry information recorded corresponding to a CPC failure after a UE occurs an RLF in a secondary cell group (SCG), and a binding relation used in an embodiment of the present disclosure.

As shown in FIG. 11, under the condition that the UE occurs an RLF in the SCG and a subsequent CPC fails, the UE may record information related to a radio link failure or synchronous reconfiguration failure in the SCG and may further record cell change failure related information for this CPC candidate cell, for example, RACH information, cell measurement results, etc.

For such information, the UE may record separate related information entries for an SCG failure/synchronous reconfiguration success or failure, etc., and bind or combine the associated UE record information.

The associated UE record information means that the different information recorded is each mobility success/failure information record from the UE occurs an SCG failure or PSCell change failure until current SCG reconfiguration is complete successfully.

Embodiment 2

Figure 12:
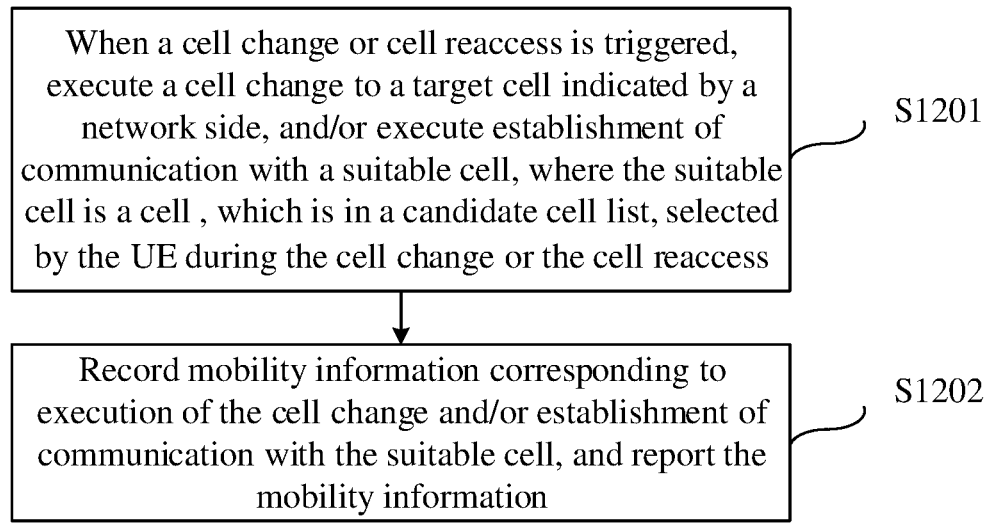
FIG. 12 is a schematic flowchart of a method for reporting mobility information according to an embodiment of the present disclosure.

An embodiment of the present disclosure provides a method for reporting mobility information. As shown in FIG. 12, the method includes the following steps.

S1201, when a cell change or cell reaccess is triggered, execute a cell change to a target cell indicated by a network side, and/or execute establishment of communication with a suitable cell, where the suitable cell is a cell, which is in a candidate cell list, selected by the UE during the cell change or the cell reaccess.

S1202, record mobility information corresponding to execution of the cell change and/or mobility information corresponding to establishment of communication with the suitable cell, and report the mobility information.

Specifically, S1201 includes: when a cell change or cell reaccess is triggered, execute a cell change to a target cell indicated by a network side, and/or, select a suitable cell and establish communication with the suitable cell when the suitable cell is in a candidate cell list.

Optionally, the method for reporting mobility information further includes at least one of following steps: when it is determined that a DAPS handover to the target cell fails, perform a radio resource connection fallback to a source cell, and record mobility information; or when it is determined that a network is not successfully accessed after the cell change, execute radio resource connection reestablishment, and record mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the step of recording mobility information includes executing any one of following steps: record that the DAPS handover to the target cell fails, and radio resource connection fallback to the source cell succeeds; record that the DAPS handover to the target cell fails, the UE occurs a radio link failure (RLF) in the source cell, and execution of radio resource connection reestablishment succeeds/fails; record that the DAPS handover to the target cell fails, the UE occurs an RLF in the source cell, and the UE selects a suitable cell and a conditional handover (CHO) for establishing communication with the suitable cell succeeds; record that the DAPS handover to the target cell fails, the UE occurs an RLF in the source cell, a subsequent CHO fails, and execution of radio connection reestablishment succeeds/fails; record that the DAPS handover to the target cell succeeds; record that the DAPS handover to the target cell succeeds, the UE occurs an RLF in the target cell, and radio resource connection fallback to the source cell succeeds; record that the DAPS handover to the target cell succeeds, the UE occurs an RLF in the target cell, the UE occurs an RLF in the source cell, and execution of radio resource connection reestablishment succeeds/fails; record that the DAPS handover to the target cell succeeds, the UE occurs an RLF in the target cell, and a subsequent CHO succeeds; or record that the DAPS handover to the target cell succeeds, the UE occurs an RLF in the target cell, a subsequent CHO fails, and execution of radio resource connection reestablishment succeeds/fails.

Optionally, when a scene triggering cell reaccess is that the UE occurs a radio link failure (RLF) in a master cell group (MCG)/secondary cell group (SCG), the step of recoding mobility information includes executing any one of following steps: record that the UE occurs an RLF in the MCG, and the UE selects a suitable cell and a CHO for establishing communication with the suitable cell succeeds; record that the UE occurs an RLF in the MCG, the UE selects a suitable cell and a CHO for establishing communication with the suitable cell fails, and the UE continuously selects a suitable cell and a CHO succeeds/fails; record that the UE occurs an RLF in the MCG, and the UE selects a suitable cell and a CHO for establishing communication with the suitable cell fails; record that the UE occurs an RLF in the MCG, the UE selects a suitable cell and a CHO for establishing communication with the suitable cell fails, and continuous execution of radio resource connection reestablishment succeeds/fails; record that after the UE occurs an RLF in the SCG, the UE selects a suitable cell and a conditional primary secondary cell change (CPC) for establishing communication with the suitable cell succeeds; or record that the UE occurs an RLF in the SCG, the UE selects a suitable cell and a CPC for establishing communication with the suitable cell fails, and the UE continuously selects a suitable cell and a CPC succeeds/fails.

Optionally, under the condition that the scene type for the cell change is an HO/PSCell change/CHO/CPC, the step of recording mobility information includes any one of following steps: record that after the HO to the target cell/the UE selects a suitable cell and the CHO for establishing communication with the suitable cell fails, a subsequent CHO succeeds; record that after the HO/CHO to the target cell fails, a subsequent CHO fails; record that after the HO/CHO to the target cell fails, a subsequent CHO fails, and continuous execution of radio resource connection reestablishment succeeds/fails; record that after the HO/CHO to the target cell fails, continuous execution of radio resource connection reestablishment succeeds/fails; record that the HO/CHO to the target cell succeeds; record that the traditional primary secondary cell change (PSCell change)/the UE selects a suitable cell and the CPC for establishing communication with the suitable cell fails, and a subsequent CPC succeeds; record that the traditional primary secondary cell change (PSCell change)/the CPC fails, and a subsequent CPC fails; or record that the traditional primary secondary cell change (PSCell change)/the UE selects a suitable cell and the CPC for establishing communication with the suitable cell succeeds.

Optionally, under the condition that the mobility information includes multiple entries, before reporting the mobility information, the method is further configured to: determine the multiple entries having an associated relation, and merge content portions, belonging to a same information item and having a content similarity satisfying a requirement, of the multiple entries; and/or, bind the multiple entries having an associated relation, and record the associated relation between the bound multiple entries.

Optionally, the step of combining content portions of the multiple entries belonging to the same information items and having a content similarity satisfying a requirement includes combining any one or more of the following content portions: a cell level/beam level signal measurement result for a serving/neighboring cell; or geographic position information.

Optionally, any one or more of the following unmerged content portions of the multiple entries are listed individually in the multiple entries: timestamp information; timer information; a reason for recording each entry; or random access channel (RACH) related information.

Optionally, the step of recording the associated relation between the bound multiple entries includes at least one of following steps: record related entries having an associated relation, and when a cell change of a new scene type is determined, delete a previously recorded entry; use the same identify to point to the related entries having an associated relation; or use a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

The method for reporting mobility information at a UE side according to the embodiment of the present disclosure belongs to the same inventive concept as the UE of Embodiment 1 of the present disclosure. Various implementations for reporting mobility information applied to the UE side in the system provided in the above embodiments may be applied to the method for reporting mobility information applied to the UE side in this embodiment, which will not be repeated herein.

Embodiment 3

Figure 13:
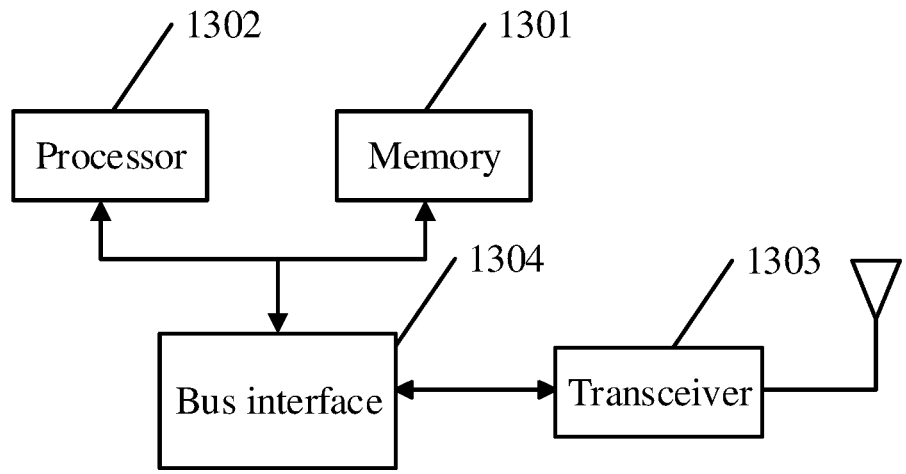
FIG. 13 is a schematic diagram of a user equipment (UE) for reporting mobility information according to an embodiment of the present disclosure.

An embodiment of the present disclosure provides a UE for reporting mobility information. As shown in FIG. 13, the UE includes: a memory 1301, a processor 1302, a transceiver 1303, and a bus interface 1304.

The processor 1302 is responsible for managing a bus architecture and general processing, and the memory 1301 may store data used by the processor 1302 in execution operations. The transceiver 1303 is configured for receiving and transmitting data under control of the processor 1302.

The bus architecture may include any number of interconnected buses and bridges, specifically connects various circuits of one or more processors, represented by the processor 1302, and a memory, represented by the memory 1301, together. The bus architecture may also connect various other circuits, for example, a peripheral, a voltage regulator, a power management circuit, etc, which are well known in the art, and therefore, will not be described any further herein. The bus interface provides an interface. The processor 1302 is responsible for managing a bus architecture and general processing, and the memory 1301 may store data used by the processor 1302 in execution operations.

A flow disclosed in the embodiment of the present disclosure may be applied to the processor 1302, or implemented by the processor 1302. During implementation, steps of a signal processing flow may be completed by means of an integrated logic circuit of hardware or in the form of instructions of software in the processor 1302. The processor 1302 may be a general purpose processor, a digital signal processor, an application-specific integrated circuit, a field programmable gate array or other programmable logic device, a discrete gate or a transistor logic device, a discrete hardware component that may implement or execute the methods, steps, and logical block diagrams disclosed in the embodiment of the present disclosure. The general purpose processor may be a microprocessor or any conventional processor, etc. The steps of the methods disclosed in conjunction with the embodiment of the present disclosure may be directly completed by a hardware processor, or completed by a combination of hardware and software modules in the processor. the software module may be located in a random access memory, a flash memory, a read-only memory, a programmable read-only memory or electrically erasable programmable memory, a register, and other storage media well known in the art. The storage medium is located in the memory 1301, and processor 1302 reads information from the memory 1301 and completes the steps of the signal processing flow in conjunction with its hardware.

Specifically, the processor 1302 is configured for reading a program from the memory 1301 and executing following steps: when a cell change or cell reaccess is triggered, execute a cell change to a target cell indicated by a network side, and/or execute establishment of communication with a suitable cell, where the suitable cell is a cell, which is in a candidate cell list, selected by the UE during the cell change or the cell reaccess; and record mobility information corresponding to execution of the cell change and/or mobility information corresponding to establishment of communication with the suitable cell, and report the mobility information.

Specifically, the processor 1302 is configured for reading a program from the memory 1301 and executing following steps: when a cell change or cell reaccess is triggered, execute a cell change to a target cell indicated by a network side, and/or, select a suitable cell and establish communication with the suitable cell when the suitable cell is in a candidate cell list.

Optionally, the processor 1302 is further configured for executing at least one of following steps: when it is determined that a DAPS handover to the target cell fails, perform a radio resource connection fallback to a source cell, and record mobility information; or when it is determined that a network is not successfully accessed after the cell change, execute radio resource connection reestablishment, and record mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the processor 1302 executes any one of following steps when recording mobility information: record that the DAPS handover to the target cell fails, and radio resource connection fallback to the source cell succeeds; record that the DAPS handover to the target cell fails, the UE occurs a radio link failure (RLF) in the source cell, and execution of radio resource connection reestablishment succeeds/fails; record that the DAPS handover to the target cell fails, the UE occurs an RLF in the source cell, and the UE selects a suitable cell and a conditional handover (CHO) for establishing communication with the suitable cell succeeds; record that the DAPS handover to the target cell fails, the UE occurs an RLF in the source cell, a subsequent CHO fails, and execution of radio connection reestablishment succeeds/fails; record that the DAPS handover to the target cell succeeds; record that the DAPS handover to the target cell succeeds, the UE occurs an RLF in the target cell, and radio resource connection fallback to the source cell succeeds; record that the DAPS handover to the target cell succeeds, the UE occurs an RLF in the target cell, the UE occurs an RLF in the source cell, and execution of radio resource connection reestablishment succeeds/fails; record that the DAPS handover to the target cell succeeds, the UE occurs an RLF in the target cell, and a subsequent CHO succeeds; or record that the DAPS handover to the target cell succeeds, the UE occurs an RLF in the target cell, a subsequent CHO fails, and execution of radio resource connection reestablishment succeeds/fails.

Optionally, under the condition that a scene triggering cell reaccess is that the UE occurs a radio link failure (RLF) in an MCG/SCG, the processor 1302 executes any one of following steps when recoding mobility information: record that the UE occurs an RLF in the MCG, and the UE selects a suitable cell and a CHO for establishing communication with the suitable cell succeeds; record that the UE occurs an RLF in the MCG, the UE selects a suitable cell and a CHO for establishing communication with the suitable cell fails, and the UE continuously selects a suitable cell and a CHO succeeds/fails; record that the UE occurs an RLF in the MCG, and the UE selects a suitable cell and a CHO for establishing communication with the suitable cell fails; record that the UE occurs an RLF in the MCG, the UE selects a suitable cell and a CHO for establishing communication with the suitable cell fails, and continuous execution of radio resource connection reestablishment succeeds/fails; record that after the UE occurs an RLF in the SCG, the UE selects a suitable cell and a conditional primary secondary cell change (CPC) for establishing communication with the suitable cell succeeds; or record that the UE occurs an RLF in the SCG, the UE selects a suitable cell and a CPC for establishing communication with the suitable cell fails, and the UE continuously selects a suitable cell and a CPC succeeds/fails.

Optionally, under the condition that a scene type of the cell change is an HO/PSCell change/CHO/CPC, the processor 1302 executes any one of following steps when recording mobility information: record that after the HO to the target cell/the UE selects a suitable cell and the CHO for establishing communication with the suitable cell fails, a subsequent CHO succeeds; record that after the HO/CHO to the target cell fails, a subsequent CHO fails; record that after the HO/CHO to the target cell fails, a subsequent CHO fails, and continuous execution of radio resource connection reestablishment succeeds/fails; record that after the HO/CHO to the target cell fails, continuous execution of radio resource connection reestablishment succeeds/fails; record that the HO/CHO to the target cell succeeds; record that the traditional primary secondary cell change (PSCell change)/the UE selects a suitable cell and the CPC for establishing communication with the suitable cell fails, and a subsequent CPC succeeds; record that the traditional primary secondary cell change (PSCell change)/the CPC fails, and a subsequent CPC fails; or record that the traditional primary secondary cell change (PSCell change)/the UE selects a suitable cell and the CPC for establishing communication with the suitable cell succeeds.

Optionally, the mobility information includes multiple entries, and before reporting the mobility information, the processor 1302 is further configured for: determining the multiple entries having an associated relation, and merging content portions, belonging to a same information item and having a content similarity satisfying a requirement, of the multiple entries; and/or, binding the multiple entries having an associated relation, and recording the associated relation between the bound multiple entries.

Optionally, the processor 1302 merges content portions, belonging to the same information item and having the content similarity satisfying the requirement, of the multiple entries, and is further configured for merging any one or more of the following content portions: a cell level/beam level signal measurement result for a serving/neighboring cell; or geographic position information.

Optionally, the processor 1302 lists any one or more of the following unmerged content portions of the multiple entries individually in the multiple entries: timestamp information; timer information; a reason for recording each entry; or random access channel (RACH) related information.

Optionally, the processor 1302 executes at least one of following steps when recording the associated relation between the bound multiple entries: record related entries having an associated relation, and when a cell change of a new scene type is determined, delete a previously recorded entry; use the same identify to point to the related entries having an associated relation; or use a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

The UE for reporting mobility information according to the embodiment of the present disclosure belongs to the same inventive concept as the UE of Embodiment 1 of the present disclosure. Various implementations for reporting mobility information applied to the UE side in the system provided in the above embodiments may be applied to the UE applied to reporting mobility information in this embodiment, which will not be repeated herein.

Figure 14:
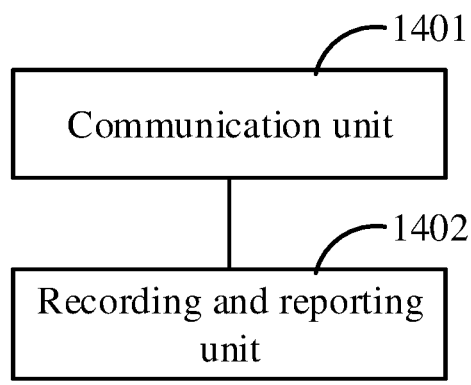
FIG. 14 is a schematic diagram of a UE for reporting mobility information according to an embodiment of the present disclosure.

An embodiment of the present disclosure provides a UE for reporting mobility information. As shown in FIG. 14, the UE includes: a communication unit 1401 configured for executing, when a cell change or cell reaccess is triggered, a cell change to a target cell indicated by a network side, and/or executing establishment of communication with a suitable cell, where the suitable cell is a cell, which is in a candidate cell list, selected by the UE during the cell change or the cell reaccess; and a recording and reporting unit 1402 configured for recording mobility information corresponding to execution of the cell change and/or mobility information corresponding to establishment of communication with the suitable cell, and reporting the mobility information.

Specifically, the communication unit 1401 is configured to execute, when a cell change or a cell reaccess is triggered, a cell handover to a target cell indicated by a network side, and/or, select a suitable cell and establish communication with the suitable cell when the suitable cell is in a candidate cell list.

Optionally, the communication unit 1401 is further configured for executing at least one of following steps: when it is determined that a DAPS handover to the target cell fails, perform a radio resource connection fallback to a source cell, and record mobility information; or when it is determined that a network is not successfully accessed after the cell change, execute radio resource connection reestablishment, and record mobility information.

Optionally, the mobility information includes any one or more of a scene type, a failure cause, a signal measurement result, a target cell/suitable cell, or each mobility success/failure.

Optionally, under the condition that a scene type of the cell change is a DAPS handover, the recording and reporting unit 1402 is specifically configured for executing any one of following steps when recording mobility information: record that the DAPS handover to the target cell fails, and radio resource connection fallback to the source cell succeeds; record that the DAPS handover to the target cell fails, the UE occurs a radio link failure (RLF) in the source cell, and execution of radio resource connection reestablishment succeeds/fails; record that the DAPS handover to the target cell fails, the UE occurs an RLF in the source cell, and the UE selects a suitable cell and a conditional handover (CHO) for establishing communication with the suitable cell succeeds; record that the DAPS handover to the target cell fails, the UE occurs an RLF in the source cell, a subsequent CHO fails, and execution of radio connection reestablishment succeeds/fails; record that the DAPS handover to the target cell succeeds; record that the DAPS handover to the target cell succeeds, the UE occurs an RLF in the target cell, and radio resource connection fallback to the source cell succeeds; record that the DAPS handover to the target cell succeeds, the UE occurs an RLF in the target cell, the UE occurs an RLF in the source cell, and execution of radio resource connection reestablishment succeeds/fails; record that the DAPS handover to the target cell succeeds, the UE occurs an RLF in the target cell, and a subsequent CHO succeeds; or record that the DAPS handover to the target cell succeeds, the UE occurs an RLF in the target cell, a subsequent CHO fails, and execution of radio resource connection reestablishment succeeds/fails.

Optionally, under the condition that a scene triggering cell reaccess is that the UE occurs an RLF in an MCG/SCG, the recording and reporting unit 1402 is specifically configured for executing any one of following steps when recoding mobility information: record that the UE occurs an RLF in the MCG, and the UE selects a suitable cell and a CHO for establishing communication with the suitable cell succeeds; record that the UE occurs an RLF in the MCG, the UE selects a suitable cell and a CHO for establishing communication with the suitable cell fails, and the UE continuously selects a suitable cell and a CHO succeeds/fails; record that the UE occurs an RLF in the MCG, and the UE selects a suitable cell and a CHO for establishing communication with the suitable cell fails; record that the UE occurs an RLF in the MCG, the UE selects a suitable cell and a CHO for establishing communication with the suitable cell fails, and continuous execution of radio resource connection reestablishment succeeds/fails; record that after the UE occurs an RLF in the SCG, the UE selects a suitable cell and a conditional primary secondary cell change (CPC) for establishing communication with the suitable cell succeeds; or record that the UE occurs an RLF in the SCG, the UE selects a suitable cell and a CPC for establishing communication with the suitable cell fails, and the UE continuously selects a suitable cell and a CPC succeeds/fails.

Optionally, under the condition that a scene type of the cell change is an HO/PSCell change/CHO/CPC, the recording and reporting unit 1402 is specifically configured for executing any one of following steps when recording mobility information: record that after the HO to the target cell/the UE selects a suitable cell and the CHO for establishing communication with the suitable cell fails, a subsequent CHO succeeds; record that after the HO/CHO to the target cell fails, a subsequent CHO fails; record that after the HO/CHO to the target cell fails, a subsequent CHO fails, and continuous execution of radio resource connection reestablishment succeeds/fails; record that after the HO/CHO to the target cell fails, continuous execution of radio resource connection reestablishment succeeds/fails; record that the HO/CHO to the target cell succeeds; record that the traditional primary secondary cell change (PSCell change)/the UE selects a suitable cell and the CPC for establishing communication with the suitable cell fails, and a subsequent CPC succeeds; record that the traditional primary secondary cell change (PSCell change)/the CPC fails, and a subsequent CPC fails; or record that the traditional primary secondary cell change (PSCell change)/the UE selects a suitable cell and the CPC for establishing communication with the suitable cell succeeds.

Optionally, the mobility information includes multiple entries, and before reporting the mobility information, the recording and reporting unit 1402 is further configured for: determining the multiple entries having an associated relation, and merging content portions, belonging to a same information item and having a content similarity satisfying a requirement, of the multiple entries; and/or, binding the multiple entries having an associated relation, and recording the associated relation between the bound multiple entries.

Optionally, the recording and reporting unit 1402 merges content portions, belonging to the same information item and having the content similarity satisfying the requirement, of the multiple entries, and is further configured for merging any one or more of the following content portions: a cell level/beam level signal measurement result for a serving/neighboring cell; or geographic position information.

Optionally, the recording and reporting unit 1402 lists any one or more of the following unmerged content portions of the multiple entries individually in the multiple entries: timestamp information; timer information; a reason for recording each entry; or random access channel (RACH) related information.

Optionally, the recording and reporting unit 1402 is specifically configured for executing at least one of following steps when recording the associated relation between the bound multiple entries: record related entries having an associated relation, and when a cell change of a new scene type is determined, delete a previously recorded entry; use the same identify to point to the related entries having an associated relation; or use a hierarchical protocol architecture to only contain the same entries having an associated relation in one container.

Optionally, the mobility information includes: an information record of each mobility success/failure from triggering the cell change/cell reaccess to the UE successfully completing a cell change/radio resource connection fallback/radio resource connection reestablishment/entering an idle or inactive state.

The UE for reporting mobility information according to the embodiment of the present disclosure belongs to the same inventive concept as the UE of Embodiment 1 of the present disclosure. Various implementations for reporting mobility information applied to the UE side in the system provided in the above embodiments may be applied to the UE applied to reporting mobility information in this embodiment, which will not be repeated herein.

An embodiment of the present disclosure provides a computer-readable storage medium, storing a computer program, where the program implements steps of the method for reporting mobility information provided in Embodiment 2 when executed by a processor.

In the several embodiments provided in the present application, it should be understood that the disclosed systems, apparatuses and methods can be implemented in other ways. For example, the apparatus embodiments described above are merely illustrative. For example, the division of the modules is merely a division of logical functions, and in practice there can be other ways of division. For example, multiple modules or assemblies can be merged or integrated into another system, or some features can be ignored or not executed. Furthermore, coupling or direct coupling or communication connection between each other as shown or discussed can be achieved by means of some interfaces, and indirect coupling or communication connection between apparatuses or modules can be in an electrical form, a mechanical form or other forms.

The modules illustrated as separate components can be physically separate or not, and the components shown as modules can be physical modules or not, that is, can be located in one place, or can also be distributed over multiple network modules. Some or all of the modules may be selected according to actual needs to achieve the purpose of the solutions of the embodiments.

In addition, the functional modules in the embodiments of the present application can be integrated into one processing module, or each module can be physically present separately, or two or more modules can be integrated into one module. The above integrated modules can be implemented in the form of hardware, or can be implemented in the form of a software function module. The integrated module can be stored in a computer-readable storage medium when implemented in the form of a software function module and sold or used as an independent product.

The embodiments described above can be implemented in whole or in part by software, hardware, firmware, or any combination thereof. When implemented by software, the embodiments can be implemented in whole or in part as a computer program product.

The computer program product includes one or more computer instructions. When loaded and executed on a computer, the computer program instruction generates in whole or in part the flows or functions described in accordance with the embodiments of the present application. The computer can be a general purpose computer, a special purpose computer, a computer network, or other programmable apparatuses. The computer instruction can be stored in a computer-readable storage medium or transmitted from one computer-readable storage medium to another computer-readable storage medium. For example, the computer instruction can be transmitted from one website, computer, server, or data center to another website, computer, server, or data center in a mode of a wire (for example, coaxial cable, optical fiber, digital subscriber line (DSL)) or radio (for example, infrared, radio, microwave, etc.). The computer-readable storage medium can be any available medium that can be stored by a computer or a data storage device including one or more available media integrated as a server, data center, etc. The available medium can be a magnetic medium (for example, floppy disk, hard disk, magnetic tape), an optical medium (for example, digital video disk (DVD)), or a semiconductor medium (for example, solid state disk (SSD)), etc.

The technical solution provided in the present application is described in detail. A principle and an implementation mode of the present application are described by specific examples, and the description of the above embodiments is merely configured to help to understand the method and the core idea of the present application. Further, for those of ordinary skill in the art, according to the idea of the present application, the specific implementation mode and the application range can be changed. Therefore, the content of the specification should not be construed as a limitation on the present application.

Those skilled in the art will appreciate that embodiments of the present application can be provided as a method, system, or computer program product. Thus, the present application can take the form of an entire hardware embodiment, an entire software embodiment or an embodiment combining software and hardware aspects. Furthermore, the present application can take the form of a computer program product implemented on one or more computer-available storage media (including but not limited to a magnetic disk memory, a compact disc read-only memory (CD-ROM) an optical memory, etc.) containing computer-available program codes.

The present application is described with reference to flowcharts and/or block diagrams of a method, a device (system), and a computer program product according to the present application. It will be understood that each flow and/or block of the flowcharts and/or block diagrams, and combinations of flows and/or blocks in the flowcharts and/or block diagrams can be implemented by computer program instructions. These computer program instructions can be provided for a processor of a general purpose computer, a special purpose computer, an embedded processor, or other programmable data processing devices to generate a machine, such that the instructions, which are executed by the processor of the computer or other programmable data processing devices, can generate apparatuses for implementing functions specified in one or more flows in the flowcharts and/or one or more blocks in the block diagrams.

These computer program instructions can also be stored in a computer-readable memory that can direct the computers or other programmable data processing devices to work in a particular manner, such that the instructions stored in the computer-readable memory generate an article of manufacture including an instruction apparatus that implements the functions specified in one or more flows in the flowcharts and/or one or more blocks in the block diagrams.

These computer program instructions can also be loaded onto the computers or other programmable data processing devices to execute a series of operational steps on the computers or other programmable devices so as to generate a process implemented by the computers, such that the instructions that are executed by the computers or other programmable devices provide steps for implementing the functions specified in one or more flows in the flowcharts and/or one or more blocks in the block diagrams.

It will be apparent to those skilled in the art that various modifications and variations can be made to the present application without departing from the spirit and scope of the present application. In this way, it is intended that the present application cover such modifications and variations that fall within the scope of the appended claims and their equivalents, as well.

What is claimed is:

1. A method for reporting mobility information, performed by a user equipment (UE) and comprising:
   in a condition that a cell change or cell reaccess is triggered, executing a cell change to a target cell indicated by a network side, and/or executing establishment of communication with a suitable cell, wherein the suitable cell is a cell, which is in a candidate cell list, selected by the UE during the cell change or the cell reaccess; and
   recording mobility information corresponding to execution of the cell change and/or mobility information corresponding to establishment of communication with the suitable cell, and reporting the mobility information;
   wherein under a condition that the mobility information comprises multiple entries, before reporting the mobility information, the method further comprises:
   determining the multiple entries having an associated relation, and merging content portions, belonging to a same information item and having a content similarity satisfying a requirement, of the multiple entries; and/or
   binding the multiple entries having an associated relation, and recording the associated relation between the bound multiple entries.

2. The method according to claim 1, further comprising at least one of following steps:
   in a condition that it is determined that a dual active protocol stack (DAPS) handover to the target cell fails, performing a radio resource connection fallback to a source cell, and recording mobility information; or
   in a condition that it is determined that a network is not successfully accessed after the cell change, executing radio resource connection reestablishment, and recording mobility information.

3. The method according to claim 1, wherein the mobility information comprises:
   any one or more of a scene type, a failure cause, a signal measurement result, a target cell/suitable cell, or each mobility success/failure; and/or
   an information record of each mobility success/failure from triggering the cell change/cell reaccess to the UE successfully completing a cell change/radio resource connection fallback/radio resource connection reestablishment/entering an idle or inactive state.

4. The method according to claim 1, wherein under a condition that a scene type of the cell change is a dual active protocol stack (DAPS) handover, the recording mobility information comprises executing any one of following steps:
   recording that the DAPS handover to the target cell fails, and radio resource connection fallback to the source cell succeeds;
   recording that the DAPS handover to the target cell fails, the UE occurs a radio link failure (RLF) in the source cell, and execution of radio resource connection reestablishment succeeds/fails;
   recording that the DAPS handover to the target cell fails, the UE occurs an RLF in the source cell, and the UE selects a suitable cell and a conditional handover (CHO) for establishing communication with the suitable cell succeeds;
   recording that the DAPS handover to the target cell fails, the UE occurs an RLF in the source cell, a subsequent CHO fails, and execution of radio connection reestablishment succeeds/fails;
   recording that the DAPS handover to the target cell succeeds;
   recording that the DAPS handover to the target cell succeeds, the UE occurs an RLF in the target cell, and radio resource connection fallback to the source cell succeeds;
   recording that the DAPS handover to the target cell succeeds, the UE occurs an RLF in the target cell, the UE occurs an RLF in the source cell, and execution of radio resource connection reestablishment succeeds/fails;

recording that the DAPS handover to the target cell succeeds, the UE occurs an RLF in the target cell, and a subsequent CHO succeeds; or recording that the DAPS handover to the target cell succeeds, the UE occurs an RLF in the target cell, a subsequent CHO fails, and execution of radio resource connection reestablishment succeeds/fails.

5. The method according to claim 1, wherein under a condition that a scene triggering cell reaccess is that the UE occurs a radio link failure (RLF) in a master cell group (MCG)/secondary cell group (SCG), the recoding mobility information comprises executing any one of following steps:

recording that the UE occurs an RLF in the MCG, and the UE selects a suitable cell and a CHO for establishing communication with the suitable cell succeeds;

recording that the UE occurs an RLF in the MCG, the UE selects a suitable cell and a CHO for establishing communication with the suitable cell fails, and the UE continuously selects a suitable cell and a CHO succeeds/fails;

recording that the UE occurs an RLF in the MCG, and the UE selects a suitable cell and a CHO for establishing communication with the suitable cell fails;

recording that the UE occurs an RLF in the MCG the UE selects a suitable cell and a CHO for establishing communication with the suitable cell fails, and continuous execution of radio resource connection reestablishment succeeds/fails;

recording that after the UE occurs an RLF in the SCG, the UE selects a suitable cell and a conditional primary secondary cell change (CPC) for establishing communication with the suitable cell succeeds; or recording that the UE occurs an RLF in the SCG, the UE selects a suitable cell and a CPC for establishing communication with the suitable cell fails, and the UE continuously selects a suitable cell selected and a CPC succeeds/fails.

6. The method according to claim 1, wherein under a condition that a scene type of the cell change is a traditional handover (HO)/primary secondary cell change (PSCell change)/CHO/CPC, the recording mobility information comprises executing any one of following steps:

recording that after the HO to the target cell fails/the UE selects a suitable cell and the CHO for establishing communication with the suitable cell fails, a subsequent CHO succeeds;

recording that after the HO/CHO to the target cell fails, a subsequent CHO fails;

recording that after the HO/CHO to the target cell fails, a subsequent CHO fails, and continuous execution of radio resource connection reestablishment succeeds/fails;

recording that after the HO/CHO to the target cell fails, continuous execution of radio resource connection reestablishment succeeds/fails;

recording that the HO/CHO to the target cell succeeds;

recording that the traditional primary secondary cell change (PSCell change) fails/the UE selects a suitable cell and the CPC for establishing communication with the suitable cell fails, and a subsequent CPC succeeds;

recording that the traditional primary secondary cell change (PSCell change)/the CPC fails, and a subsequent CPC fails; or recording that the traditional primary secondary cell change (PSCell change) succeeds/the UE selects a suitable cell and the CPC for establishing communication with the suitable cell succeeds.

7. The method according to claim 1, wherein the merging content portions, belonging to the same information item and having the content similarity satisfying the requirement, of the multiple entries comprises merging any one or more of following content portions:

a cell level/beam level signal measurement result for a serving/neighboring cell; or geographic position information.

8. The method according to claim 1, wherein any one or more of following unmerged content portions of the multiple entries are listed individually in the multiple entries:

timestamp information;

timer information;

a reason for recording each entry; or random access channel (RACH) related information.

9. The method according to claim 1, wherein the recording the associated relation between the bound multiple entries comprises executing at least one of following steps:

recording related entries having an associated relation, and in a condition that a cell change of a new scene type is determined, deleting a previously recorded entry;

using a same identify to point to related entries having an associated relation; or using a hierarchical protocol architecture to only contain the same entries having an associated relation in one container.

10. A user equipment (UE) for reporting mobility information, comprising a memory and a processor, wherein:

the memory is configured for storing a computer program; and the processor is configured for reading the program from the memory and execute following steps:

in a condition that a cell change or cell reaccess is triggered, executing a cell change to a target cell indicated by a network side, and/or executing establishment of communication with a suitable cell, wherein the suitable cell is a cell, which is in a candidate cell list, selected by the UE during the cell change or the cell reaccess; and recording mobility information corresponding to execution of the cell change and/or mobility information corresponding to establishment of communication with the suitable cell, and reporting the mobility information;

the mobility information comprises multiple entries, and before reporting the mobility information, the processor is further configured for:

determining the multiple entries having an associated relation, and merging content portions, belonging to a same information item and having a content similarity satisfying a requirement, of the multiple entries; and/or binding the multiple entries having an associated relation, and recording the associated relation between the bound multiple entries.

11. The UE according to claim 10, wherein the processor is further configured for executing at least one of following steps:

in a condition that it is determined that a dual active protocol stack (DAPS) handover to the target cell fails, performing a radio resource connection fallback to a source cell, and recording mobility information; or in a condition that it is determined that a network is not successfully accessed after the cell change, executing radio resource connection reestablishment, and recording mobility information.

12. The UE according to claim 10, wherein the mobility information comprises:
   any one or more of a scene type, a failure cause, a signal measurement result, a target cell/suitable cell, or each mobility success/failure; and/or
   an information record of each mobility success/failure from triggering the cell change/cell reaccess to the UE successfully completing a cell change/radio resource connection fallback/radio resource connection reestablishment/entering an idle or inactive state.

13. The UE according to claim 10, wherein under the condition that a scene type of the cell change is a dual active protocol stack (DAPS) handover, the processor executes any one of following steps when recording mobility information:
   recording that the DAPS handover to the target cell fails, and radio resource connection fallback to the source cell succeeds;
   recording that the DAPS handover to the target cell fails, the UE occurs a radio link failure (RLF) in the source cell, and execution of radio resource connection reestablishment succeeds/fails;
   recording that the DAPS handover to the target cell fails, the UE occurs an RLF in the source cell, and the UE selects a suitable cell and a conditional handover (CHO) for establishing communication with the suitable cell succeeds;
   recording that the DAPS handover to the target cell fails, the UE occurs an RLF in the source cell, a subsequent CHO fails, and execution of radio connection reestablishment succeeds/fails;
   recording that the DAPS handover to the target cell succeeds;
   recording that the DAPS handover to the target cell succeeds, the UE occurs an RLF in the target cell, and radio resource connection fallback to the source cell succeeds;
   recording that the DAPS handover to the target cell succeeds, the UE occurs an RLF in the target cell, the UE occurs an RLF in the source cell, and execution of radio resource connection reestablishment succeeds/fails;
   recording that the DAPS handover to the target cell succeeds, the UE occurs an RLF in the target cell, and a subsequent CHO succeeds; or
   recording that the DAPS handover to the target cell succeeds, the UE occurs an RLF in the target cell, a subsequent CHO fails, and execution of radio resource connection reestablishment succeeds/fails.

14. The UE according to claim 10, wherein under a condition that a scene triggering cell reaccess is that the UE occurs a radio link failure (RLF) in a master cell group (MCG)/secondary cell group (SCG), the processor executes any one of following steps when recoding mobility information:
   recording that the UE occurs an RLF in the MCG, and the UE selects a suitable cell and a CHO for establishing communication with the suitable cell succeeds;
   recording that the UE occurs an RLF in the MCG, the UE selects a suitable cell and a CHO for establishing communication with the suitable cell fails, and the UE continuously selects a suitable cell and a CHO succeeds/fails;
   recording that the UE occurs an RLF in the MCG, and the UE selects a suitable cell and a CHO for establishing communication with the suitable cell fails;
   recording that the UE occurs an RLF in the MCG, the UE selects a suitable cell and a CHO for establishing communication with the suitable cell fails, and continuous execution of radio resource connection reestablishment succeeds/fails;
   recording that after the UE occurs an RLF in the SCG, the UE selects a suitable cell and a conditional primary secondary cell change (CPC) for establishing communication with the suitable cell succeeds; or
   recording that the UE occurs an RLF in the SCG, the UE selects a suitable cell and a CPC for establishing communication with the suitable cell fails, and the UE continuously selects a suitable cell and a CPC succeeds/fails.

15. The UE according to claim 10, wherein under a condition that a scene type of the cell change is a traditional handover (HO)/PSCell change/CHO/CPC, the processor executes any one of following steps when recording mobility information:
   recording that after the HO to the target cell fails/the UE selects a suitable cell and the CHO for establishing communication with the suitable cell fails, a subsequent CHO succeeds;
   recording that after the HO/CHO to the target cell fails, a subsequent CHO fails;
   recording that after the HO/CHO to the target cell fails, a subsequent CHO fails, and continuous execution of radio resource connection reestablishment succeeds/fails;
   recording that after the HO/CHO to the target cell fails, continuous execution of radio resource connection reestablishment succeeds/fails;
   recording that the HO/CHO to the target cell succeeds;
   recording that the traditional primary secondary cell change (PSCell change) fails/the UE selects a suitable cell and the CPC for establishing communication with the suitable cell fails, and a subsequent CPC succeeds;
   recording that the traditional primary secondary cell change (PSCell change)/the CPC fails, and a subsequent CPC fails; or
   recording that the traditional primary secondary cell change (PSCell change) succeeds/the UE selects a suitable cell and the CPC for establishing communication with the suitable cell succeeds.

16. The UE according to claim 10, wherein the processor merges content portions, belonging to the same information item and having the content similarity satisfying the requirement, of the multiple entries, and is further configured for merging any one or more of following content portions:
   a cell level/beam level signal measurement result for a serving/neighboring cell; or
   geographic position information.

17. The UE according to claim 10, wherein the processor lists any one or more of following unmerged content portions of the multiple entries individually in the multiple entries:
   timestamp information;
   timer information;
   a reason for recording each entry; or
   random access channel (RACH) related information.

18. The UE according to claim 10, wherein the processor executes at least one of following steps when recording the associated relation between the bound multiple entries:

recording related entries having an associated relation, and in a condition that a cell change of a new scene type is determined, deleting a previously recorded entry;

using a same identify to point to related entries having an associated relation; or using a hierarchical protocol architecture to only contain the same entries having an associated relation in one container.

\* \* \* \* \*